United States Patent
Zhou et al.

(10) Patent No.: US 11,388,710 B2
(45) Date of Patent: *Jul. 12, 2022

(54) UPLINK INFORMATION SENDING METHOD AND APPARATUS, DOWNLINK INFORMATION SENDING METHOD AND APPARATUS, DOWNLINK INFORMATION RECEIVING METHOD AND APPARATUS AND SYSTEM SCHEDULING METHOD AND APPARATUS

(71) Applicant: Huawei Technologies Co., Ltd., Shenzhen (CN)

(72) Inventors: Han Zhou, Shanghai (CN); Meng Hua, Shanghai (CN); Xiaolei Tie, Shanghai (CN); Gengshi Wu, Shanghai (CN); Yiling Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,183

(22) Filed: Nov. 6, 2020

(65) Prior Publication Data

US 2021/0058911 A1 Feb. 25, 2021

Related U.S. Application Data

(63) Continuation of application No. 15/659,774, filed on Jul. 26, 2017, now Pat. No. 10,834,714, which is a
(Continued)

(30) Foreign Application Priority Data

Apr. 14, 2015 (CN) .................. PCT/CN2015/076543
Feb. 6, 2016 (CN) .......................... 201610084148.7

(51) Int. Cl.
*H04W 72/12* (2009.01)
*H04W 72/04* (2009.01)

(52) U.S. Cl.
CPC ......... *H04W 72/042* (2013.01); *H04W 72/12* (2013.01); *H04W 72/1284* (2013.01); *Y02D 30/70* (2020.08)

(58) Field of Classification Search
CPC ............... H04W 72/042; H04W 72/12; H04W 72/1284; H04W 4/70; H04W 72/1268;
(Continued)

(56) References Cited

U.S. PATENT DOCUMENTS 9,014,063 B2 4/2015 Lee
9,112,692 B2 8/2015 Chen et al.
(Continued)

FOREIGN PATENT DOCUMENTS

CN 101009537 A 8/2007
CN 101742532 A 6/2010
(Continued)

OTHER PUBLICATIONS

3GPP TS 36.211 V12.5.0 (Mar. 2015), 3rd Generation Partnership Project; Technical Specification Group Radio Access Network; Evolved Universal Terrestrial Radio Access (E-UTRA); Physical channels and modulation(Release 12), 136 pages.
(Continued)

*Primary Examiner* — Julio R Perez
(74) *Attorney, Agent, or Firm* — Slater Matsil, LLP

(57) ABSTRACT

A method and apparatus is provided. The method includes: obtaining downlink control information, wherein the downlink control information is used to schedule downlink data, and the downlink control information carries time information indicating a time at which uplink information is sent; obtaining, through a system message or radio resource
(Continued)

control signaling or a resource of a physical random access channel, information indicating a duration for sending the uplink information; receiving the downlink data; and sending the uplink information according to the time information and the information indicating the duration, wherein the uplink information is used to indicates whether the downlink data is correctly received.

20 Claims, 16 Drawing Sheets

Related U.S. Application Data continuation of application No. PCT/CN2016/076419, filed on Mar. 15, 2016.

(58) Field of Classification Search
CPC .......... H04W 72/1273; H04W 72/1289; Y02D 30/70
See application file for complete search history.

(56) References Cited

U.S. PATENT DOCUMENTS

| | | | |
|---|---|---|---|
| 11,082,963 | B2* | 8/2021 | Lin .................. H04L 1/1854 |
| 2009/0067364 | A1 | 3/2009 | Chang et al. |
| 2012/0052860 | A1 | 3/2012 | Faronius et al. |
| 2012/0114030 | A1 | 5/2012 | Yue et al. |
| 2012/0207107 | A1 | 8/2012 | Li et al. |
| 2013/0044706 | A1 | 2/2013 | Suzuki et al. |
| 2013/0322378 | A1 | 12/2013 | Guan et al. |
| 2014/0022960 | A1 | 1/2014 | Fu et al. |
| 2014/0211751 | A1 | 7/2014 | Zhang et al. |
| 2015/0341953 | A1 | 11/2015 | Xia et al. |
| 2015/0382328 | A1 | 12/2015 | Jiang et al. |
| 2016/0157215 | A1* | 6/2016 | Shiizaki ............ H04W 72/0413 370/329 |
| 2016/0192333 | A1 | 6/2016 | Wang et al. |
| 2018/0242317 | A1 | 8/2018 | Marinier et al. |
| 2019/0364417 | A1* | 11/2019 | Patil .................. H04L 41/0893 |
| 2020/0322946 | A1* | 10/2020 | Jiang .................. H04W 72/042 |
| 2021/0058911 | A1 | 2/2021 | Zhou et al. |
| 2021/0219329 | A1* | 7/2021 | Zhou .................. H04L 5/0053 |
| 2021/0266941 | A1* | 8/2021 | Park .................. H04W 72/0413 |
| 2021/0289481 | A1* | 9/2021 | Harada .............. H04W 72/042 |

FOREIGN PATENT DOCUMENTS

| | | |
|---|---|---|
| CN | 102082641 A | 6/2011 |
| CN | 102237927 A | 11/2011 |
| CN | 102868497 A | 1/2013 |
| CN | 102916789 A | 2/2013 |
| CN | 103178942 A | 6/2013 |
| CN | 103227704 A | 7/2013 |
| CN | 103238363 A | 8/2013 |
| CN | 103580830 A | 2/2014 |
| CN | 103582073 A | 2/2014 |
| CN | 103841603 A | 6/2014 |
| CN | 104144508 A | 11/2014 |
| CN | 104335509 A | 2/2015 |
| CN | 104348580 A | 2/2015 |
| CN | 106060948 B | 9/2018 |
| DE | 602004000642 T2 | 5/2007 |
| WO | 2014069946 A1 | 5/2014 |
| WO | 2014121723 A1 | 8/2014 |
| WO | 2014181156 A1 | 11/2014 |
| WO | 2014204285 A1 | 12/2014 |
| WO | 2015018040 A1 | 2/2015 |

OTHER PUBLICATIONS

Huawei et al, "UCI for NB-IoT", 3GPP TSG RAN WG1 Meeting #84, R1-160324, Feb. 15-19, 2016, 5 pages, St. Julian's, Malta.

3GPP, "3rd Generation Partnership Project; Technical Specification Group GSM/EDGE Radio Access Network Cellular System Support for Ultra Low Complexity and Low Throughput Internet of Things; (Release 13)", 3GPP TR 45.820 V1.0.0, 3rd Generation Partnership Project (3GPP), Mobile Compeience Centre; Mar. 13, 2015, 164 pages.

3rd Generation Partnership Project; Technical Specification Group Radio Access Network; Evolved Universal Terrestrial Radio Access (E-UTRA); Multiplexing and channel coding (Release 12), 3GPP TS 36. 212, V12. 4. 0, Mar. 1, 2015,94 pages.

3GPP TS 36.213, "3rd Generation Partnership Project;Technical Specification Group Radio Access Network; Evolved Universal Terrestrial Radio Access (E-UTRA); Physical layer procedures(Release 12)", (Mar. 2015), 239 pages, V12.5.0.

3GPP TS 36.331, "3rd Generation Partnership Project;Technical Specification Group Radio Access Network; Evolved Universal Terrestrial Radio Access (E-UTRA); Radio Resource Control (RRC); Protocol specification (Release 12)", (Mar. 2015), 445 pages, V12. 5.0.

Huawei et al: "Achieving ultra long battery life with LTE", 3GPP TSG RAN WG1 Meeting #bis, R1-143715, Ljubljana, Slovenia; Oct. 5, 2014, 3rd Generation Partnership Project(3GPP), Mobile Competence Cnetre, 4 pages.

Intel Corporation; "Control channel enhancement for unicast transmission for MTC", 3GPP TSG RAN WG1 Meeting #79, R1-144661, Nov. 17-21, 2014. 6 pages, San Francisco, USA.

Intel Corporation; "Uplink physical channels for Rel-13 low complexity MTC Ues", 3GPP TSG RAN WG1 Meeting #80, R1-150079, Feb. 9-13, 2015, 3 pages, Athens, Greece.

ZTE, "Consideration on physical uplink control channel for MTC enhancement," 3GPP TSG RAN WG1 Meeting #80bis, R1-151731,Belgrade, Serbia; Apr. 20-24, 2015, 6 pages.

* cited by examiner

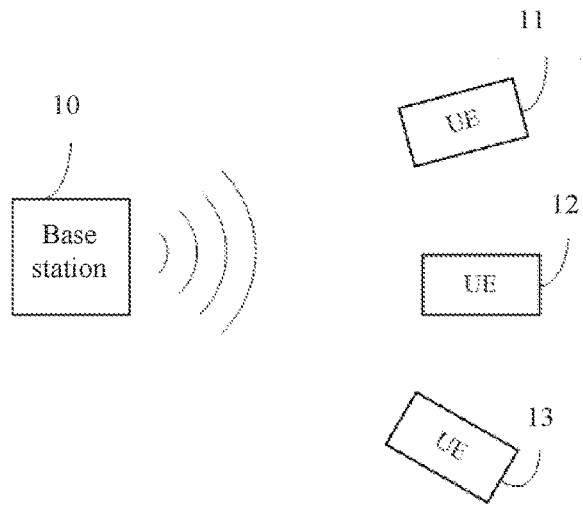

| 20 bit | 4 bit | 4 bit | 6 bit | 6 bit | 1 bit | 4 bit | 3 bit |
|---|---|---|---|---|---|---|---|
| C-RNTI | R | MCS | Duration | CH_ID | ULPN | Start Indicator | R |

| 20 bit | 4 bit | 4 bit | 6 bit | 6 bit | 1 bit | 6 bit | 4 bit | 4 bit | 6 bit | 1 bit | 10 bit |
|---|---|---|---|---|---|---|---|---|---|---|---|
| RNTI | DL_CH_ID | DL_MCS | DL_Start Indicator | DL_Duration | DLPN | UL_CH_ID | UL_MCS | UL_Start Indicator | Duration | ULPN | R |

| R | R | R | DL number | Feedback_Start_Indicator | UL number | DL&UL number | RACH number | DL Allocation | UL Allocation | DL&UL Allocation | RACH Config | Padding |
|---|---|---|---|---|---|---|---|---|---|---|---|---|

| RNTI | DL_CH_ID | DL_MCS | DL_Start Indicator | DL_Duration | DLPN | UL_CH_ID | Feedback offset | R |
|---|---|---|---|---|---|---|---|---|

| RNTI | CH_ID | MCS | Start Indicator | Duration | DLPN | Feedback offset | R |
|---|---|---|---|---|---|---|---|

UPLINK INFORMATION SENDING METHOD AND APPARATUS, DOWNLINK INFORMATION SENDING METHOD AND APPARATUS, DOWNLINK INFORMATION RECEIVING METHOD AND APPARATUS AND SYSTEM SCHEDULING METHOD AND APPARATUS

CROSS-REFERENCE TO RELATED APPLICATIONS

This application is a continuation of U.S. patent application Ser. No. 15/659,774, filed on Jul. 26, 2017, which is a continuation of International Application No. PCT/CN2016/076419, filed on Mar. 15, 2016, which claims priority to International Application No. PCT/CN2015/076543, filed on Apr. 14, 2015, and Chinese Patent Application No. 201610084148.7, filed on Feb. 6, 2016. All of the aforementioned patent applications are hereby incorporated by reference in their entireties.

TECHNICAL FIELD

The present invention relates to the mobile communications field, and in particular, to an uplink information sending method and apparatus, a downlink information sending method and apparatus, a downlink information receiving method and apparatus, and a system scheduling method and apparatus.

BACKGROUND

MTC (Machine Type Communication) is an important application in the future communications field. In future, MTC may cover smart meter reading, medical detection, logistics detection, fire detection, and wearable-device communication, and the like. Currently, an important type of MTC is MTC based on an existing cellular network infrastructure, and generally this type of MTC is referred to as Cellular MTC. 3GPP RAN1 introduces concerns for and standardization on an MTC service since the version Rel-12.

Currently, a Cellular MTC service has requirements for both a base station and UE (User Equipment). The requirements for the base station are mainly: 1. Large coverage requirement. Generally, the MTC service does not need a quite high service rate, but needs a capability of supporting large coverage. The large coverage refers to that an MTC base station has a relatively strong coverage enhancement technology, and can provide communications services for user equipment in a case of a relatively large penetration loss (such as 20 dB). For example, user equipment in a smart meter reading service, that is, a smart water/power meter or the like, is generally installed indoors or even in a basement, and it is hard to provide reliable communication services for devices in these positions by using an existing cellular network technology. 2. A large quantity of connections: One MTC base station may serve a large quantity (more than tens of thousands) of Internet of Things terminal devices, such as smart water/power meters and wearable devices that are deployed on a large scale. How to prevent network congestion when connection services are provided for multiple Internet of Things terminal devices at a same time is a problem to be resolved. The requirements for the UE are mainly as follows: 1. Costs are low to fulfill large-scale deployment, for example, a meter reading service. 2. Power consumption is low, so that there is a relatively long battery endurance capability.

In current MTC, the following two manners are usually used to expand a coverage range: 1. Repetition (or spectrum spreading), that is, a same data packet is transmitted multiple times, and a receiver combines signals received multiple times and performs decoding, so as to increase a probability of correct reception; 2. A narrowband signal is sent by means of Power Boosting. If transmit power of a transmitter keeps unchanged, sending a narrowband signal may improve a power spectrum density of the signal and increase an anti-interference capability of the signal, so as to enlarge coverage. However, the foregoing two manners have respective disadvantages. In manner 1, a same data packet needs to be sent multiple times, which occupies a data transmission time and reduces a transmission rate. In addition, more UE power may be consumed due to multiple times of repeated transmission. In manner 2, although total uplink transmit power is unchanged, in boosting, a narrowband is used for sending, and therefore signal bandwidth is reduced. This is equivalent to that a transmission rate is reduced, a transmission time is prolonged, and UE power consumption overheads are also increased.

SUMMARY

Embodiments of the present invention provide an uplink information sending method and apparatus, a downlink information sending method and apparatus, a downlink information receiving method and apparatus, and a system scheduling method and apparatus, so as to reduce scheduling power consumption.

According to a first aspect, an uplink information sending method is provided, including: obtaining, by user equipment, downlink control information DCI and downlink data, where at least one of the DCI or the downlink data carries a portion of uplink scheduling information of the user equipment, the uplink scheduling information is indication information required by the user equipment for sending uplink information, the uplink information is used to indicate whether the user equipment receives the downlink data correctly, the portion of the uplink scheduling information is specifically indication information excluding a specific parameter of the user equipment, and the specific parameter includes at least one of an uplink modulation and coding scheme MCS or information used to indicate duration for sending the uplink information. The uplink information sending method also includes sending, by the user equipment, the uplink information according to the portion of the uplink scheduling information and the specific parameter, where the specific parameter is a parameter preset in the user equipment or a parameter received by the user equipment from a system message.

With reference to the first aspect, in a first implementation manner of the first aspect, the portion of the uplink scheduling information which is carried in the DCI or the specific parameter includes time information, where the time information is used to indicate a time at which the user equipment sends the uplink information; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the first implementation manner of the first aspect, in a second implementation manner of the first aspect, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of the uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

With reference to the first implementation manner of the first aspect, in a third implementation manner of the first aspect, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

With reference to the first aspect, in a fourth implementation manner of the first aspect, the portion of the uplink scheduling information of the user equipment which is carried in the downlink data specifically includes at least one of a channel frequency at which the uplink information is sent or a data packet number of a protocol data unit PDU in which the uplink information is sent.

With reference to the fourth implementation manner of the first aspect, in a fifth implementation manner of the first aspect, the downlink data is specifically a media access control MAC PDU, the MAC PDU includes a MAC payload, the MAC payload includes a MAC data element or a MAC control element, and the portion of the uplink scheduling information of the user equipment which is carried in the downlink data is specifically carried in the MAC data element or the MAC control element of the MAC payload.

With reference to the first aspect, in a sixth implementation manner of the first aspect, the information used to indicate duration for sending the uplink information specifically includes a repetition factor for sending the uplink information or time duration for sending the uplink information.

With reference to the first aspect or any one of the foregoing implementation manners of the first aspect, in a seventh implementation manner of the first aspect, the DCI further includes the downlink scheduling information, where the downlink scheduling information is used to schedule the user equipment to receive the downlink data; the portion of the uplink scheduling information includes the channel frequency of the uplink information; and the specific parameter includes the uplink modulation and coding scheme MCS.

With reference to the first aspect or any one of the foregoing implementation manners of the first aspect, in an eighth implementation manner of the first aspect, the duration information of the uplink information is obtained by the user equipment from radio resource control RRC signaling; or the duration information of the uplink information is obtained by the user equipment from a mapping of a control parameter of the downlink data, and the control parameter of the downlink data includes at least one of the MCS of the downlink data or a quantity of retransmission times of the downlink data; or the duration information of the uplink information is obtained by the user equipment from a resource mapping of a physical random access channel; and the duration information of the uplink information is used to indicate a quantity of retransmission times of the uplink information or the duration for sending the uplink information.

According to a second aspect, an uplink information sending method is provided, including: obtaining, by user equipment, DCI and downlink data, where the DCI or a specific parameter includes time information, the time information is used to indicate a time at which the user equipment sends uplink information, the uplink information is used to indicate whether the user equipment receives the downlink data correctly, and the specific parameter is a parameter preset in the user equipment or a parameter received by the user equipment from a system message; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment; and sending, by the user equipment, the uplink information at the time indicated by the time information.

With reference to the second aspect, in a first implementation manner of the second aspect, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

According to a third aspect, a downlink information receiving method is provided, including: obtaining, by user equipment, DCI sent by a base station; sending, by the user equipment, uplink data to the base station, where the DCI or a specific parameter includes time information, the specific parameter is a parameter preset in the user equipment or a parameter received by the user equipment from a system message, the time information is used to indicate a time at which the user equipment receives downlink information sent by the base station, and the downlink information is used to indicate whether the base station receives the uplink data correctly; and the time information specifically includes an interval from a preset time point to the time at which the downlink information is received; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for receiving the downlink information after a preset time point, where the preset time point is a parameter received by the user equipment from the DCI or the system message, or a parameter preset in the user equipment; and receiving, by the user equipment, the downlink information at the time indicated by the time information.

With reference to the third aspect, in a first implementation manner of the third aspect, the scheduling information specifically includes uplink scheduling information, uplink scheduling information of all user equipments in the user equipment set is sorted in sequence in the DCI, and the sequence number for receiving the downlink information is specifically determined according to a sequence number, in a normal order or a reverse order, of uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for receiving the downlink information is specifically a sequence number, in a normal order or a reverse order, of downlink scheduling information of the user equipment in the downlink scheduling information of all the user equipments in the user equipment set.

According to a fourth aspect, a system scheduling method is provided, including: determining, uplink scheduling information of user equipment, where the uplink scheduling information is indication information required by the user equipment for sending uplink information; sending DCI and sending downlink data to the user equipment, where at least one of the DCI or the downlink data carries a portion of the uplink scheduling information, the uplink information is used to indicate whether the user equipment receives the downlink data correctly, the portion of the uplink scheduling information is specifically indication information excluding a specific parameter of the user equipment, and the specific parameter includes at least one of an uplink modulation and coding scheme MCS or information used to indicate duration for sending the uplink information; and sending a system message to the user equipment, where the system message carries the specific parameter.

With reference to the fourth aspect, in a first implementation manner of the fourth aspect, the portion of the uplink scheduling information which is carried in the DCI or the specific parameter includes time information, where the time information is used to indicate a time at which the user equipment sends the uplink information; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the first implementation manner of the fourth aspect, in a second implementation manner of the fourth aspect, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of the uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

With reference to the first implementation manner of the fourth aspect, in a third implementation manner of the fourth aspect, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

With reference to the fourth aspect, in a fourth implementation manner of the fourth aspect, the portion of the uplink scheduling information of the user equipment which is carried in the downlink data specifically includes at least one of a channel frequency at which the uplink information is sent or a data packet number of a protocol data unit PDU in which the uplink information is sent.

With reference to the fourth implementation manner of the fourth aspect, in a fifth implementation manner of the fourth aspect, the downlink data is specifically a media access control MAC PDU, the MAC PDU includes a MAC payload, the MAC payload includes a MAC data element or a MAC control element, and the portion of the uplink scheduling information of the user equipment which is carried in the downlink data is specifically carried in the MAC data element or the MAC control element of the MAC payload.

With reference to the fourth aspect, in a sixth implementation manner of the fourth aspect, the information used to indicate duration for sending the uplink information specifically includes a repetition factor for sending the uplink information or time duration for sending the uplink information.

With reference to the fourth aspect or any one of the foregoing implementation manners of the fourth aspect, in a seventh implementation manner of the fourth aspect, the DCI further includes the downlink scheduling information, where the downlink scheduling information is used to schedule the user equipment to receive the downlink data; the portion of the uplink scheduling information includes the channel frequency of the uplink information; and the specific parameter includes the uplink modulation and coding scheme MCS.

With reference to the fourth aspect or any one of the foregoing implementation manners of the fourth aspect, in an eighth implementation manner of the fourth aspect, the duration information of the uplink information is obtained by the user equipment from radio resource control RRC signaling; or the duration information of the uplink information is obtained by the user equipment from a mapping of a control parameter of the downlink data, and the control parameter of the downlink data includes at least one of the MCS of the downlink data or a quantity of retransmission times of the downlink data; or the duration information of the uplink information is obtained by the user equipment from a resource mapping of a physical random access channel; and the duration information of the uplink information is used to indicate a quantity of retransmission times of the uplink information or the duration for sending the uplink information.

According to a fifth aspect, a system scheduling method is provided, including: determining time information, where the time information is used to indicate a time at which user equipment sends uplink information; sending DCI or a system message to the user equipment; and sending downlink data to the user equipment, where the DCI or the system message carries the time information, and the uplink information is used to indicate whether the user equipment receives the downlink data correctly; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the fifth aspect, in a first implementation manner of the fifth aspect, the scheduling information specifically includes uplink scheduling information, uplink scheduling information of all user equipments in the user equipment set is sorted in sequence in the DCI, and the sequence number for sending the uplink information is specifically determined according to a sequence number, in a normal order or a reverse order, of uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for sending the uplink information is specifically determined according to a sequence number, in a normal order or a reverse order, of downlink scheduling information of the user equipment in the downlink scheduling information of all the user equipments in the user equipment set.

According to a sixth aspect, a downlink information sending method is provided, including: determining, by a base station, time information, where the time information is used to indicate a time at which user equipment receives downlink information; sending, by the base station, DCI or a system message to the user equipment; receiving, by the base station, uplink data sent by the user equipment; and sending, by the base station, the downlink information to the user equipment at a time indicated by the time information, where the downlink information is used to indicate whether the base station receives the uplink data correctly, where the DCI or the system message carries the time information, and the time information specifically includes an interval from a preset time point to a time at which uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the sixth aspect, in a first implementation manner of the sixth aspect, the scheduling information specifically includes uplink scheduling information, uplink scheduling information of all user equipments in the user equipment set is sorted in sequence in the DCI, and the sequence number for receiving the downlink information is specifically determined according to a sequence number, in a normal order or a reverse order, of uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for receiving the downlink information is specifically determined according to a sequence number, in a normal order or a reverse order, of downlink scheduling information of the user equipment in the downlink scheduling information of all the user equipments in the user equipment set.

According to a seventh aspect, an uplink information sending apparatus is provided, including: an obtaining module, configured to obtain downlink control information DCI and downlink data, where at least one of the DCI or the downlink data carries a portion of uplink scheduling information of the uplink information sending apparatus, the uplink scheduling information is indication information required by the uplink information sending apparatus for sending uplink information, the uplink information is used to indicate whether the obtaining module receives the downlink data correctly, the portion of the uplink scheduling information is specifically indication information excluding a specific parameter of the uplink information sending apparatus, and the specific parameter includes at least one of an uplink modulation and coding scheme MCS or information used to indicate duration for sending the uplink information; and a sending module, configured to send the uplink information according to the portion of the uplink scheduling information and the specific parameter, where the specific parameter is a parameter preset in the uplink information sending apparatus or a parameter received by the uplink information sending apparatus from a system message.

With reference to the seventh aspect, in a first implementation manner of the seventh aspect, the portion of the uplink scheduling information which is carried in the DCI or the specific parameter includes time information, where the time information is used to indicate a time at which the sending module sends the uplink information; and the time information specifically includes an interval from a preset time point to the time at which the uplink information is sent; or the DCI further carries scheduling information, excluding the time information, of the uplink information sending apparatus and scheduling information of another uplink information sending apparatus, the uplink information sending apparatus and the another uplink information sending apparatus form an uplink information sending apparatus set, and the time information carried in the DCI specifically includes a sequence number of the uplink information sending apparatus in the uplink information sending apparatus set for sending the uplink information after a preset time point, where the preset time point is a parameter received by the uplink information sending apparatus from the DCI or the system message, or a parameter preset in the uplink information sending apparatus.

With reference to the first implementation manner of the seventh aspect, in a second implementation manner of the seventh aspect, the scheduling information specifically includes uplink scheduling information, uplink scheduling information of all uplink information sending apparatuses in the uplink information sending apparatus set is sorted in sequence in the DCI, and the sequence number for sending the uplink information is specifically a sequence number, in a normal order or a reverse order, of the uplink scheduling information of the uplink information sending apparatus in the uplink scheduling information of all the uplink information sending apparatuses in the uplink information sending apparatus set; or the scheduling information specifically includes downlink scheduling information, downlink scheduling information of all uplink information sending apparatuses in the uplink information sending apparatus set is sorted in sequence in the DCI, and the sequence number for sending the uplink information is specifically a sequence number, in a normal order or a reverse order, of downlink scheduling information of the uplink information sending apparatus in the downlink scheduling information of all the uplink information sending apparatuses in the uplink information sending apparatus set.

With reference to the first implementation manner of the seventh aspect, in a third implementation manner of the seventh aspect, the preset time point is specifically a time point at which the obtaining module completes downlink data reception, or is specifically a time point at which the obtaining module starts to receive the downlink data, or is specifically a time point at which the obtaining module receives the (preset numeric value)$^{th}$ piece of DCI after the DCI, or is specifically a time point after preset duration since the obtaining module receives the (preset numeric value)$^{th}$ piece of DCI after the DCI.

With reference to the seventh aspect, in a fourth implementation manner of the seventh aspect, the portion of the uplink scheduling information of the uplink information sending apparatus which is carried in the downlink data specifically includes at least one of a channel frequency at which the uplink information is sent or a data packet number of a protocol data unit PDU in which the uplink information is sent.

With reference to the fourth implementation manner of the seventh aspect, in a fifth implementation manner of the seventh aspect, the downlink data is specifically a media access control MAC PDU, the MAC PDU includes a MAC payload, the MAC payload includes a MAC data element or a MAC control element, and the portion of the uplink scheduling information of the uplink information sending apparatus which is carried in the downlink data is specifically carried in the MAC data element or the MAC control element of the MAC payload.

With reference to the seventh aspect, in a sixth implementation manner of the seventh aspect, the information used to indicate duration for sending the uplink information specifically includes a repetition factor for sending the uplink information or time duration for sending the uplink information.

With reference to the seventh aspect and any one of the foregoing implementation manners of the seventh aspect, in a seventh implementation manner of the seventh aspect, the DCI further includes the downlink scheduling information, where the downlink scheduling information is used to schedule the uplink information sending apparatus to receive the downlink data; the portion of the uplink scheduling information includes the channel frequency of the uplink information; and the specific parameter includes the uplink modulation and coding scheme MCS.

With reference to the seventh aspect and any one of the foregoing implementation manners of the seventh aspect, in an eighth implementation manner of the seventh aspect, the duration information of the uplink information is obtained by the uplink information sending apparatus from radio resource control RRC signaling; or the duration information of the uplink information is obtained by the uplink information sending apparatus from a mapping of a control parameter of the downlink data, and the control parameter of the downlink data includes at least one of the MCS of the downlink data or a quantity of retransmission times of the downlink data; or the duration information of the uplink information is obtained by the uplink information sending apparatus from a resource mapping of a physical random access channel; and the duration information of the uplink information is used to indicate a quantity of retransmission times of the uplink information or the duration for sending the uplink information.

According to an eighth aspect, an uplink information sending apparatus is provided, including: an obtaining module, configured to obtain DCI and downlink data, where the DCI or a specific parameter includes time information, where the time information is used to indicate a time at which the uplink information sending apparatus sends uplink information, the uplink information is used to indicate whether the obtaining module receives the downlink data correctly, and the specific parameter is a parameter preset in the uplink information sending apparatus or a parameter received by the uplink information sending apparatus from a system message; and the time information specifically includes an interval from a preset time point to the time at which the uplink information is sent; or the DCI further carries scheduling information, excluding the time information, of the uplink information sending apparatus and scheduling information of another uplink information sending apparatus, the uplink information sending apparatus and the another uplink information sending apparatus form an uplink information sending apparatus set, and the time information carried in the DCI specifically includes a sequence number of the uplink information sending apparatus in the uplink information sending apparatus set for sending the uplink information after a preset time point, where the preset time point is a parameter received by the uplink information sending apparatus from the DCI or the system message, or a parameter preset in the uplink information sending apparatus; and a sending module, configured to send the uplink information at the time indicated by the time information.

With reference to the eighth aspect, in a first implementation manner of the eighth aspect, the scheduling information specifically includes uplink scheduling information, uplink scheduling information of all uplink information sending apparatuses in the uplink information sending apparatus set is sorted in sequence in the DCI, and the sequence number for sending the uplink information is specifically a sequence number, in a normal order or a reverse order, of uplink scheduling information of the uplink information sending apparatus in the uplink scheduling information of all the uplink information sending apparatuses in the uplink information sending apparatus set; or the scheduling information specifically includes downlink scheduling information, downlink scheduling information of all uplink information sending apparatuses in the uplink information sending apparatus set is sorted in sequence in the DCI, and the sequence number for sending the uplink information is specifically a sequence number, in a normal order or a reverse order, of downlink scheduling information of the uplink information sending apparatus in the downlink scheduling information of all the uplink information sending apparatuses in the uplink information sending apparatus set.

According to a ninth aspect, a downlink information receiving apparatus is provided, including: an obtaining module, configured to obtain DCI sent by a base station; a sending module, configured to send uplink data to the base station, where the DCI or a specific parameter includes time information, the specific parameter is a parameter preset in the downlink information receiving apparatus or a parameter received by the downlink information receiving apparatus from a system message, the time information is used to indicate a time at which the downlink information receiving apparatus receives downlink information sent by the base station, and the downlink information is used to indicate whether the base station receives the uplink data correctly; and the time information specifically includes an interval from a preset time point to the time at which the downlink information is received; or the DCI further carries scheduling information, excluding the time information, of the downlink information receiving apparatus and scheduling information of another downlink information receiving apparatus, the downlink information receiving apparatus and the another downlink information receiving apparatus form a downlink information receiving apparatus set, and the time information carried in the DCI specifically includes a sequence number of the downlink information receiving apparatus in the downlink information receiving apparatus set for receiving the downlink information after a preset time point, where the preset time point is a parameter received by the downlink information receiving apparatus from the DCI or the system message, or a parameter preset in the downlink information receiving apparatus; and a receiving module, configured to receive the downlink information at the time indicated by the time information.

With reference to the ninth aspect, in a first implementation manner of the ninth aspect, the scheduling information specifically includes uplink scheduling information, uplink scheduling information of all downlink information receiving apparatuses in the downlink information receiving apparatus set is sorted in sequence in the DCI, and the sequence number for receiving the downlink information is specifically determined according to a sequence number, in a normal order or a reverse order, of uplink scheduling information of the downlink information receiving apparatus in the uplink scheduling information of all the downlink information receiving apparatuses in the downlink information receiving apparatus set; or the scheduling information specifically includes downlink scheduling information, downlink scheduling information of all downlink information receiving apparatuses in the downlink information receiving apparatus set is sorted in sequence in the DCI, and the sequence number for receiving the downlink information is specifically a sequence number, in a normal order or a reverse order, of downlink scheduling information of the downlink information receiving apparatus in the downlink scheduling information of all the downlink information receiving apparatuses in the downlink information receiving apparatus set.

According to a tenth aspect, a system scheduling apparatus is provided, including: a determining module, configured to determine uplink scheduling information of user equipment, where the uplink scheduling information is indication information required by the user equipment for sending uplink information; a first sending module, configured to send DCI and send downlink data to the user equipment, where at least one of the DCI or the downlink data carries a portion of the uplink scheduling information, the uplink information is used to indicate whether the user equipment receives the downlink data correctly, the portion of the uplink scheduling information is specifically indication information excluding a specific parameter of the user equipment, and the specific parameter includes at least one of an uplink modulation and coding scheme MCS or information used to indicate duration for sending the uplink information; and a second sending module, configured to send a system message to the user equipment, where the system message carries the specific parameter.

With reference to the tenth aspect, in a first implementation manner of the tenth aspect, the portion of the uplink scheduling information which is carried in the DCI or the specific parameter includes time information, where the time information is used to indicate a time at which the user equipment sends the uplink information; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the first implementation manner of the tenth aspect, in a second implementation manner of the tenth aspect, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of the uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

With reference to the first implementation manner of the tenth aspect, in a third implementation manner of the tenth aspect, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

With reference to the tenth aspect, in a fourth implementation manner of the tenth aspect, the portion of the uplink scheduling information of the user equipment which is carried in the downlink data specifically includes at least one of a channel frequency at which the uplink information is sent or a data packet number of a protocol data unit PDU in which the uplink information is sent.

With reference to the fourth implementation manner of the tenth aspect, in a fifth implementation manner of the tenth aspect, the downlink data is specifically a media access control MAC PDU, the MAC PDU includes a MAC payload, the MAC payload includes a MAC data element or a MAC control element, and the portion of the uplink scheduling information of the user equipment which is carried in the downlink data is specifically carried in the MAC data element or the MAC control element of the MAC payload.

With reference to the tenth aspect, in a sixth implementation manner of the tenth aspect, the information used to indicate duration for sending the uplink information specifically includes a repetition factor for sending the uplink information or time duration for sending the uplink information.

With reference to the tenth aspect or any one of the foregoing implementation manners of the tenth aspect, in a seventh implementation manner of the tenth aspect, the DCI further includes the downlink scheduling information, where the downlink scheduling information is used to schedule the user equipment to receive the downlink data; the portion of the uplink scheduling information includes the channel frequency of the uplink information; and the specific parameter includes the uplink modulation and coding scheme MCS.

With reference to the tenth aspect or any one of the foregoing implementation manners of the tenth aspect, in an eighth implementation manner of the tenth aspect, the duration information of the uplink information is obtained by the user equipment from radio resource control RRC signaling; or the duration information of the uplink information is obtained by the user equipment from a mapping of a control parameter of the downlink data, and the control parameter of the downlink data includes at least one of the MCS of the downlink data or a quantity of retransmission times of the downlink data; or the duration information of the uplink information is obtained by the user equipment from a resource mapping of a physical random access channel; and the duration information of the uplink information is used to indicate a quantity of retransmission times of the uplink information or the duration for sending the uplink information.

According to an eleventh aspect, a system scheduling apparatus is provided, including: a determining module, configured to determine time information, where the time information is used to indicate a time at which user equipment sends uplink information; a first sending module, configured to send DCI or a system message to the user equipment; and a second sending module, configured to send downlink data to the user equipment, where the DCI or the system message carries the time information, and the uplink information is used to indicate whether the user equipment receives the downlink data correctly; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the eleventh aspect, in a first implementation manner of the eleventh aspect, the scheduling information specifically includes uplink scheduling information, uplink scheduling information of all user equipments in the user equipment set is sorted in sequence in the DCI, and the sequence number for sending the uplink information is specifically determined according to a sequence number, in a normal order or a reverse order, of uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for sending the uplink information is specifically determined according to a sequence number, in a normal order or a reverse order, of downlink scheduling information of the user equipment in the downlink scheduling information of all the user equipments in the user equipment set.

According to a twelfth aspect, a downlink information sending apparatus is provided, including: a determining module, configured to determine time information, where the time information is used to indicate a time at which user equipment receives downlink information; a first sending module, configured to send DCI or a system message to the user equipment; a receiving module, configured to receive uplink data sent by the user equipment; and a second sending module, configured to send the downlink information to the user equipment at a time indicated by the time information, where the downlink information is used to indicate whether the receiving module receives the uplink data correctly, where the DCI or the system message carries the time information, and the time information specifically includes an interval from a preset time point to a time at which uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point, where the preset time point is a parameter received by the user equipment from the DCI or the system message, or a parameter preset in the user equipment.

With reference to the twelfth aspect, in a first implementation manner of the twelfth aspect, the scheduling information specifically includes uplink scheduling information, uplink scheduling information of all user equipments in the user equipment set is sorted in sequence in the DCI, and the sequence number for receiving the downlink information is specifically determined according to a sequence number, in a normal order or a reverse order, of uplink scheduling information of the user equipment in the uplink scheduling information of all the user equipments in the user equipment set; or the scheduling information specifically includes downlink scheduling information, downlink scheduling information of all user equipments in the user equipment set is sorted in sequence in the DCI, and the sequence number for receiving the downlink information is specifically determined according to a sequence number, in a normal order or a reverse order, of downlink scheduling information of the user equipment in the downlink scheduling information of all the user equipments in the user equipment set.

In this embodiment of the present invention, uplink scheduling information carried in DCI is other indication information excluding a specific parameter, and the specific parameter is sent to each uplink information sending apparatus by using a system message with a lower sending frequency. This avoids decoding performed by the uplink information sending apparatus on a specific parameter in the DCI, and therefore reduces power consumption of the uplink information sending apparatus.

According to a thirteenth aspect, an uplink information sending method is provided, including: mapping uplink information onto a first sequence; performing spectrum spreading on the first sequence by using a timeslot-level sequence to obtain a second sequence; and sending the second sequence, where multiple sequence values in the first sequence are corresponding to multiple symbols respectively, multiple sequence values in the timeslot-level sequence are corresponding to a same timeslot or subframe, and the timeslot or subframe includes the multiple symbols.

Optionally, in a first implementation manner of the thirteenth aspect, the uplink information is ACK or NACK information.

Optionally, with reference to the thirteenth aspect or the first implementation manner of the thirteenth aspect, in a second implementation manner of the thirteenth aspect, the first sequence may be a Walsh sequence, a Zardoff-Chu sequence, or a pseudo-random sequence.

Optionally, with reference to the thirteenth aspect or either of the foregoing implementation manners of the thirteenth aspect, in a third implementation manner of the thirteenth aspect, the multiple sequence values in the first sequence are modulated as a modulated sequence, a reference signal is inserted between at least two sequence values in the modulated sequence to obtain the first sequence with a reference signal.

Optionally, with reference to the thirteenth aspect or any one of the foregoing implementation manners of the thirteenth aspect, in a fourth implementation manner of the thirteenth aspect, the performing spectrum spreading on the first sequence by using a timeslot-level sequence to obtain a second sequence includes: performing multiplication or modulo 2 addition on the multiple sequence values of the multiple symbols of the timeslot-level sequence and the multiple sequence values of the multiple symbols of the first sequence respectively to obtain the second sequence.

Optionally, with reference to the thirteenth aspect or any one of the foregoing implementation manners of the thirteenth aspect, in a fifth implementation manner of the thirteenth aspect, the method further includes: receiving downlink control information sent by the base station, where the downlink control information includes a rule for mapping the uplink information onto the first sequence, and an indication of the timeslot-level sequence, and time and frequency resources for sending the second sequence. Optionally, the indication includes an index number of the timeslot-level sequence or a generation parameter used to generate the timeslot-level sequence.

According to a fourteenth aspect, user equipment is provided, including: a baseband processor and a wireless transceiver coupled with the baseband processor, where the baseband processor is configured to map uplink information onto a first sequence, and perform spectrum spreading on the first sequence by using a timeslot-level sequence to obtain a second sequence; and the wireless transceiver is configured to send the second sequence, where multiple sequence values in the first sequence are corresponding to multiple symbols respectively, multiple sequence values in the timeslot-level sequence are corresponding to a same timeslot or subframe, and the timeslot or subframe includes the multiple symbols.

Optionally, in a first implementation manner of the fourteenth aspect, the uplink information is ACK or NACK information.

Optionally, with reference to the fourteenth aspect or the first implementation manner of the fourteenth aspect, in a second implementation manner of the fourteenth aspect, the first sequence may be a Walsh sequence, a Zardoff-Chu sequence, or a pseudo-random sequence.

Optionally, with reference to the fourteenth aspect or either of the foregoing implementation manners of the fourteenth aspect, in a third implementation manner of the fourteenth aspect, the multiple sequence values in the first sequence are modulated as a modulated sequence, a reference signal is inserted between at least two sequence values in the modulated sequence to obtain the first sequence with a reference signal.

Optionally, with reference to the fourteenth aspect or any one of the foregoing implementation manners of the fourteenth aspect, in a fourth implementation manner of the fourteenth aspect, the baseband processor is further configured to perform multiplication or modulo 2 addition on the multiple sequence values of the multiple symbols of the timeslot-level sequence and the multiple sequence values of the multiple symbols of the first sequence respectively to obtain the second sequence.

Optionally, with reference to the fourteenth aspect or any one of the foregoing implementation manners of the fourteenth aspect, in a fifth implementation manner of the fourteenth aspect, the wireless transceiver is further configured to receive downlink control information sent by the base station, where the downlink control information includes a rule for mapping the uplink information onto the first sequence, and an indication of the timeslot-level sequence, and time and frequency resources for sending the second sequence. Optionally, the indication includes an index number of the timeslot-level sequence or a generation parameter used to generate the timeslot-level sequence.

According to a fifteenth aspect, an uplink information sending apparatus is provided, including: a mapping unit, configured to map uplink information onto a first sequence; a spectrum spreading unit, configured to perform spectrum spreading on the first sequence by using a timeslot-level sequence to obtain a second sequence; and a sending unit, configured to send the second sequence, where multiple sequence values in the first sequence are corresponding to multiple symbols respectively, multiple sequence values in the timeslot-level sequence are corresponding to a same timeslot or subframe, and the timeslot or subframe includes the multiple symbols.

Optionally, in a first implementation manner of the fifteenth aspect, the sending apparatus may further include a first receiving unit, configured to receive downlink control information sent by the base station, where the downlink control information includes a rule for mapping the uplink information onto the first sequence, an indication of the timeslot-level sequence, and time and frequency resources for sending the second sequence. Optionally, the indication includes an index number of the timeslot-level sequence or a generation parameter used to generate the timeslot-level sequence.

Optionally, with reference to the fifteenth aspect or the first implementation manner of the fifteenth aspect, in a second implementation manner of the fifteenth aspect, the uplink information is ACK or NACK information.

Optionally, with reference to the fifteenth aspect or either of the foregoing implementation manners of the fifteenth aspect, in a third implementation manner of the fifteenth aspect, the first sequence may be a Walsh sequence, a Zardoff-Chu sequence, or a pseudo-random sequence.

Optionally, with reference to the fifteenth aspect or any one of the foregoing implementation manners of the fifteenth aspect, in a fourth implementation manner of the fifteenth aspect, the multiple sequence values in the first sequence are modulated as a modulated sequence, a reference signal is inserted between at least two sequence values in the modulated sequence to obtain the first sequence with a reference signal.

Optionally, with reference to the fifteenth aspect or any one of the foregoing implementation manners of the fifteenth aspect, in a fifth implementation manner of the fifteenth aspect, the spectrum spreading unit is specifically configured to perform multiplication or modulo 2 addition on the multiple sequence values of the multiple symbols of the timeslot-level sequence and the multiple sequence values of the multiple symbols of the first sequence respectively to obtain the second sequence.

According to a sixteenth aspect, an uplink information sending method is provided, including: obtaining, by user equipment, downlink scheduling DCI and downlink data, where the downlink scheduling DCI includes indication information and scheduling information required by the user equipment for receiving the downlink data, the indication information is used to instruct the user equipment to send first uplink information, and the first uplink information is used to indicate whether the user equipment receives the downlink data correctly; and sending, by the user equipment, the first uplink information according to an indication in the indication information.

Optionally, with reference to the sixteenth aspect, in a first implementation manner of the sixteenth aspect, the indication information includes an uplink scheduling instruction, where the uplink scheduling instruction is used to instruct the user equipment to receive uplink scheduling DCI, and the uplink scheduling DCI includes scheduling information required for sending the first uplink information.

Optionally, with reference to the sixteenth aspect, in a second implementation manner of the sixteenth aspect, the indication information includes time information, where the time information is used to indicate a time at which the user equipment sends the first uplink information; the time information specifically indicates that the user equipment sends the first uplink information at a preset time point; or the time information indicates an interval from a preset time point to the time at which the first uplink information is sent; and the preset time point is a parameter obtained by the user equipment from the downlink scheduling DCI or the downlink data, or a parameter preset in the user equipment.

Optionally, with reference to the sixteenth aspect, in a third implementation manner of the sixteenth aspect, the indication information includes frequency information, where the frequency information is used to indicate a frequency at which the user equipment sends the first uplink information; the frequency information indicates that the user equipment sends the first uplink information at a preset frequency; or the frequency information indicates an interval from a preset frequency to the frequency at which the first uplink information is sent; and the preset frequency is a parameter obtained by the user equipment from the downlink scheduling DCI or the downlink data, or a parameter preset in the user equipment.

Optionally, with reference to the sixteenth aspect or any one of the foregoing implementation manners of the sixteenth aspect, in a fourth implementation manner of the sixteenth aspect, the user equipment sends the first uplink information according to an effective transmission time of the first uplink information, where the effective transmission time includes a quantity of retransmission times of a resource element of the first uplink information or time duration for transmitting the first uplink information; and the effective transmission time is a parameter obtained by the user equipment from control signaling, where the control signaling is at least one of physical layer signaling, radio resource control RRC signaling, or system information; or the effective transmission time is obtained by the user equipment from a mapping of a control parameter of second uplink information, where the control parameter of the second uplink information includes at least one of a modulation and coding scheme MCS of the second uplink information, a quantity of retransmission times of a resource element of the second uplink information, or a quantity of subcarriers of the second uplink information, and the second uplink information is sent before the first uplink information; or the effective transmission time is obtained by the user equipment from a resource mapping of a physical random access channel PRACH; or the effective transmission time is a parameter preset in the user equipment.

According to a seventeenth aspect, a system scheduling method is provided, including: determining downlink scheduling DCI and downlink data of user equipment, where the downlink scheduling DCI includes indication information and scheduling information required by the user equipment for receiving the downlink data, the indication information is used to instruct the user equipment to send first uplink information, and the first uplink information is used to indicate whether the user equipment receives the downlink data correctly; and sending the downlink scheduling DCI and the downlink data to the user equipment.

Optionally, with reference to the seventeenth aspect, in a first implementation manner of the seventeenth aspect, the indication information includes an uplink scheduling instruction, where the uplink scheduling instruction is used to instruct the user equipment to receive uplink scheduling DCI, and the uplink scheduling DCI includes scheduling information required for sending the first uplink information.

Optionally, with reference to the seventeenth aspect, in a second implementation manner of the seventeenth aspect, the indication information includes time information, where the time information is used to indicate a time at which the user equipment sends the first uplink information; the time information indicates that the user equipment sends the first uplink information at a preset time point; or the time information indicates an interval from a preset time point to the time at which the first uplink information is sent; and the preset time point is a parameter obtained by the user equipment from the downlink scheduling DCI or the downlink data, or a parameter preset in the user equipment.

Optionally, with reference to the seventeenth aspect, in a third implementation manner of the seventeenth aspect, the indication information includes frequency information, where the frequency information is used to indicate a frequency at which the user equipment sends the first uplink information; the frequency information indicates that the user equipment sends the first uplink information at a preset frequency; or the frequency information indicates an interval from a preset frequency to the frequency at which the first uplink information is sent; and the preset frequency is a parameter obtained by the user equipment from the downlink scheduling DCI or the downlink data, or a parameter preset in the user equipment.

Optionally, with reference to the seventeenth aspect or any one of the foregoing implementation manners of the seventeenth aspect, in a fourth implementation manner of the seventeenth aspect, an effective transmission time of the first uplink information is sent to the user equipment, where the effective transmission time includes a quantity of retransmission times of a resource element of the first uplink information or time duration for transmitting the first uplink information; and the effective transmission time is a parameter included in control signaling, where the control signaling is at least one of physical layer signaling, radio resource control RRC signaling, or system information.

According to an eighteenth aspect, an uplink information sending apparatus is provided, including: an obtaining module, configured to obtain downlink scheduling DCI and downlink data, where the downlink scheduling DCI includes indication information and scheduling information required by the uplink information sending apparatus for receiving the downlink data, the indication information is used to instruct the uplink information sending apparatus to send first uplink information, and the first uplink information is used to indicate whether the uplink information sending apparatus receives the downlink data correctly; and a sending module, configured to send the first uplink information according to an indication in the indication information.

Optionally, with reference to the eighteenth aspect, in a first implementation manner of the eighteenth aspect, the indication information includes an uplink scheduling instruction, where the uplink scheduling instruction is used to instruct the uplink information sending apparatus to receive uplink scheduling DCI, and the uplink scheduling DCI includes scheduling information required for sending the first uplink information.

Optionally, with reference to the eighteenth aspect, in a second implementation manner of the eighteenth aspect, the indication information includes time information, where the time information is used to indicate a time at which the uplink information sending apparatus sends the first uplink information; the time information indicates that the uplink information sending apparatus sends the first uplink information at a preset time point; or the time information indicates an interval from a preset time point to the time at which the first uplink information is sent; and the preset time point is a parameter obtained by the uplink information sending apparatus from the downlink scheduling DCI or the downlink data, or a parameter preset in the uplink information sending apparatus.

Optionally, with reference to the eighteenth aspect, in a third implementation manner of the eighteenth aspect, the indication information includes frequency information, where the frequency information is used to indicate a frequency at which the uplink information sending apparatus sends the first uplink information; the frequency information indicates that the uplink information sending apparatus sends the first uplink information at a preset frequency; or the frequency information indicates an interval from a preset frequency to the frequency at which the first uplink information is sent; and the preset frequency is a parameter obtained by the uplink information sending apparatus from the downlink scheduling DCI or the downlink data, or a parameter preset in the uplink information sending apparatus.

Optionally, with reference to the eighteenth aspect or any one of the foregoing implementation manners of the eighteenth aspect, in a fourth implementation manner of the eighteenth aspect, the uplink information sending apparatus sends the first uplink information according to an effective transmission time of the first uplink information, where the effective transmission time includes a quantity of retransmission times of a resource element of the first uplink information or time duration for transmitting the first uplink information; and the effective transmission time is a parameter obtained by the uplink information sending apparatus from control signaling, where the control signaling is at least one of physical layer signaling, radio resource control RRC signaling, or system information; or the effective transmission time is obtained by the uplink information sending apparatus from a mapping of a control parameter of second uplink information, where the control parameter of the second uplink information includes at least one of a modulation and coding scheme MCS of the second uplink information, a quantity of retransmission times of a resource element of the second uplink information, or a quantity of subcarriers of the second uplink information, and the second uplink information is sent before the first uplink information; or the effective transmission time is obtained by the uplink information sending apparatus from a resource mapping of a physical random access channel PRACH; or the effective transmission time is a parameter preset in the uplink information sending apparatus.

According to a nineteenth aspect, a system scheduling apparatus is provided, including: a determining module, configured to determine downlink scheduling DCI and downlink data of user equipment, where the downlink scheduling DCI includes indication information and scheduling information required by the user equipment for receiving the downlink data, the indication information is used to instruct the user equipment to send first uplink information, and the first uplink information is used to indicate whether the user equipment receives the downlink data correctly; and a sending module, configured to send the downlink scheduling DCI and the downlink data to the user equipment.

Optionally, with reference to the nineteenth aspect, in a first implementation manner of the nineteenth aspect, the indication information includes an uplink scheduling instruction, where the uplink scheduling instruction is used to instruct the user equipment to receive uplink scheduling DCI, and the uplink scheduling DCI includes scheduling information required for sending the first uplink information.

Optionally, with reference to the nineteenth aspect, in a second implementation manner of the nineteenth aspect, the indication information includes time information, where the time information is used to indicate a time at which the user equipment sends the first uplink information; the time information indicates that the user equipment sends the first uplink information at a preset time point; or the time information indicates an interval from a preset time point to the time at which the first uplink information is sent; and the preset time point is a parameter obtained by the user equipment from the downlink scheduling DCI or the downlink data, or a parameter preset in the user equipment.

Optionally, with reference to the nineteenth aspect, in a third implementation manner of the nineteenth aspect, the indication information includes frequency information, where the frequency information is used to indicate a frequency at which the user equipment sends the first uplink information; the frequency information indicates that the user equipment sends the first uplink information at a preset frequency; or the frequency information indicates an interval from a preset frequency to the frequency at which the first uplink information is sent; and the preset frequency is a parameter obtained by the user equipment from the downlink scheduling DCI or the downlink data, or a parameter preset in the user equipment.

Optionally, with reference to the nineteenth aspect or any one of the foregoing implementation manners of the nineteenth aspect, in a fourth implementation manner of the nineteenth aspect, an effective transmission time of the first uplink information is sent to the user equipment, where the effective transmission time includes a quantity of retransmission times of a resource element of the first uplink information or time duration for transmitting the first uplink information; and the effective transmission time is a parameter included in control signaling, where the control signaling is at least one of physical layer signaling, radio resource control RRC signaling, or system information.

According to a twentieth aspect, an uplink information sending method is provided, including: receiving, by user equipment, downlink data; and obtaining, by the user equipment, an effective transmission time of first uplink information, and sending the uplink information according to the effective transmission time, where the first uplink information is used to indicate whether the user equipment receives the downlink data correctly; the effective transmission time includes a quantity of retransmission times of a resource element of the first uplink information or time duration for transmitting the first uplink information; and the effective transmission time is obtained by the user equipment from a mapping of a control parameter of second uplink information, where the control parameter of the second uplink information includes at least one of a modulation and coding scheme MCS of the second uplink information, a quantity of retransmission times of a resource element of the second uplink information, or a quantity of subcarriers of the second uplink information, and the second uplink information is sent before the first uplink information; or the effective transmission time is obtained by the user equipment from a resource mapping of a physical random access channel PRACH.

Optionally, with reference to the twentieth aspect, in a first implementation manner of the twentieth aspect, the downlink data is a fourth message Msg4 in random access, and the second uplink information is a third message Msg3 in the random access.

According to a twenty-first aspect, an uplink information sending apparatus is provided, including: a receiving module, configured to receive downlink data; an obtaining module, configured to obtain an effective transmission time of first uplink information; and a sending module, configured to send the uplink information according to the effective transmission time, where the first uplink information is used to indicate whether the uplink information sending apparatus receives the downlink data correctly; the effective transmission time includes a quantity of retransmission times of a resource element of the first uplink information or time duration for transmitting the first uplink information; and the effective transmission time is obtained by the uplink information sending apparatus from a mapping of a control parameter of second uplink information, where the control parameter of the second uplink information includes at least one of a modulation and coding scheme MCS of the second uplink information, a quantity of retransmission times of a resource element of the second uplink information, or a quantity of subcarriers of the second uplink information, and the second uplink information is sent before the first uplink information; or the effective transmission time is obtained by the uplink information sending apparatus from a resource mapping of a physical random access channel PRACH.

Optionally, with reference to the twenty-first aspect, in a first implementation manner of the twenty-first aspect, the downlink data is a fourth message Msg4 in random access, and the second uplink information is a third message Msg3 in the random access.

BRIEF DESCRIPTION OF THE DRAWINGS

FIG. 1 is a schematic structural diagram of an embodiment of a communications system according to an embodiment of the present invention;

FIG. 2 is a schematic diagram of a possible format of DCI;

FIG. 3 is a schematic diagram of a possible structure of DL config;

DETAILED DESCRIPTION OF ILLUSTRATIVE EMBODIMENTS

Figures 4, 5, 6:
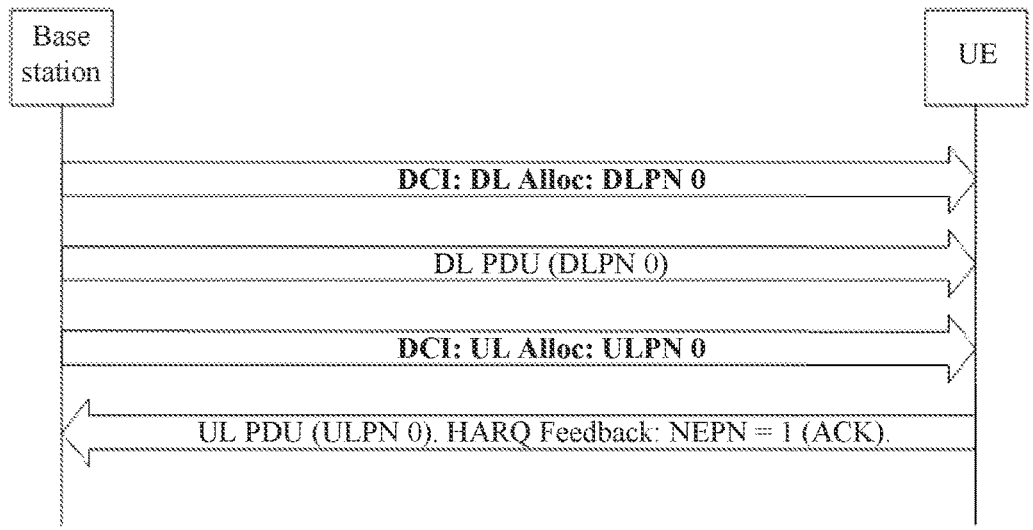
FIG. 4 is a schematic diagram of a possible structure of UL config.
FIG. 5 is a schematic diagram of a possible structure of DL&ULconfig.
FIG. 6 is a scheduling process that is possibly used in a communications system.

Embodiments of the present invention provide an uplink information sending method and apparatus, a downlink information sending method and apparatus, a downlink information receiving method and apparatus, and a system scheduling method and apparatus, so as to reduce scheduling power consumption.

To make a person skilled in the art understand the solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The terms "include", "contain" and any other variants in the specification, the claims, and the accompanying drawings of the present invention mean to cover the non-exclusive inclusion, for example, a process, method, system, product, or device that includes a list of steps or units is not necessarily limited to those steps or units, but may include other steps or units that are not expressly listed or are inherent to such a process, method, system, product, or device.

To easily understand the embodiments of the present invention, a communications system used in description of the embodiments of the present invention is first described herein. Referring to FIG. 1, FIG. 1 is a schematic structural diagram of an embodiment of a communications system according to an embodiment of the present invention. The communications system includes a base station 10 and multiple UEs, such as UE 11, UE 12, and UE 13 in FIG. 1.

In this embodiment, the communications system may be an NB M2M (Narrowband Machine to Machine) system. The NB M2M system is a narrowband-based communications system dedicated for the Internet of Things. In this communications system, the base station 10 uses DCI (Downlink Control Information) to schedule each UE to receive data sent by the base station 10 and to send data to the base station 10. Certainly, the communications system in the present invention may be another system as long as a base station uses the DCI to schedule each UE in the communications system. In addition to the DCI used for scheduling the UE, the base station further sends the UE downlink data, that is, service data from the base station to the UE.

Specifically, the base station 10 delivers one piece of DCI at a fixed time interval (referred to as a DCI interval). The DCI includes at least one UE that is possibly be scheduled in a next time period and scheduling information of the at least one UE. Each UE in the communications system may know, by receiving and decoding DCI, whether the UE is scheduled, and perform a corresponding operation according to scheduling information carried in the DCI. The following uses the UE 1 in FIG. 1 as an example to describe a process in which a base station schedules UE according to the present invention.

Before the base station 10 sends downlink data to the UE 11, scheduling information carried in DCI sent by the base station 10 to the UE 11 includes downlink scheduling information of the UE 11. The downlink scheduling information is indication information required by the UE 11 for receiving the downlink data sent by the base station.

After receiving the downlink data sent by the base station 10, the UE 11 sends uplink information to the base station 10. The uplink information is used to indicate whether the UE 11 correctly receives the downlink data sent by the base station 10. For example, the uplink information may be an ACK (acknowledgement) or NACK (Negative ACK). In the communications system of the present invention, both the downlink data sent by the base station to the UE and the uplink information sent by the UE to the base station are sent by using a MAC (Media Access Control) PDU (Protocol Data Unit). The MAC PDU is a basic data unit transmitted at a MAC layer.

Before the UE 11 sends the uplink information to the base station 10, the base station needs to send uplink scheduling information to the UE 11. The uplink scheduling information is indication information required by the UE 11 for sending the uplink information. The downlink scheduling information and the uplink scheduling information of the UE 11 may be added to a same piece of DCI and then sent to the UE 11, or may be added respectively to two pieces of DCI and then sent to the UE 11.

Referring to FIG. 2, FIG. 2 is a schematic diagram of a possible format of DCI. As shown in FIG. 2, the DCI includes R (reserved bit), DL number (quantity of UEs scheduled on a downlink), UL number (quantity of UEs scheduled on an uplink), DL&UL number (quantity of UEs scheduled on a downlink and an uplink at the same time), RACH number (quantity of UEs scheduled for RACH access), DL Allocation (downlink scheduling configuration), UL Allocation (uplink scheduling configuration), DL&UL Allocation (downlink and uplink scheduling configuration), RACH config (RACH scheduling configuration), and Padding (padding bit). It should be noted that DL number indicates a quantity of UEs that need to receive downlink data, and UL number indicates a quantity of UEs that are allowed to perform uplink sending.

In the DCI shown in FIG. 2, a quantity of entries configured in DL Allocation corresponds to DL number, DL Allocation includes a DL number of DL configs, and each DL config carries downlink scheduling information of a corresponding UE.

A quantity of entries configured in UL Allocation corresponds to UL number, UL Allocation includes a UL number of UL configs, and each UL config carries uplink scheduling information of a corresponding UE.

A quantity of entries configured in DL&UL Allocation corresponds to DL&UL number, DL&UL Allocation includes a DL&UL number of DL&ULconfigs, and each DL&ULconfig carries uplink scheduling information and downlink scheduling information of a corresponding UE.

If the base station performs only downlink scheduling for the UE 11, the downlink scheduling information of the UE 11 is included in DL Allocation. If the base station performs only uplink scheduling for the UE 11, the uplink scheduling information of the UE 11 is included in UL Allocation. If the base station performs both downlink scheduling and uplink scheduling for the UE 11, the uplink scheduling information and the downlink scheduling information of the UE 11 are included in DL&UL Allocation.

Indication information included in downlink scheduling information and uplink scheduling information of UE may differ in different communications systems. The following describes an embodiment of DL config and an embodiment of UL config respectively with reference to FIG. 3 and FIG. 4.

As shown in FIG. 3, FIG. 3 is a schematic diagram of a possible structure of DL config. DL config includes:

RNTI (radio network temporary identifier), used to indicate an ID (Identity) of UE;

CH_ID, used to indicate a channel frequency on which downlink data is transmitted;

MCS (Modulation and Coding Scheme), used to indicate a modulation and coding scheme used when downlink data is transmitted, facilitating decoding by UE;

Start Indicator, used to indicate a relative start time at which downlink data is transmitted;

Duration, used to indicate duration for transmitting downlink data;

DLPN, used to indicate a data packet number of a PDU sent on a downlink; and

R, indicates a reserved bit.

As shown in FIG. 4, FIG. 4 is a schematic diagram of a possible structure of UL config. UL config includes:

C-RNTI, used to indicate an ID of UE;

R, indicates a reserved bit;

MCS, used to indicate a modulation and coding scheme used when uplink data is transmitted;

Duration, used to indicate duration for transmitting uplink data;

CH_ID, used to indicate a channel frequency on which uplink data is transmitted;

ULPN, used to indicate a data packet number of a PDU sent on an uplink; and

Start Indicator, used to indicate a relative start time at which uplink data is transmitted.

As shown in FIG. 5, FIG. 5 is a schematic diagram of a possible structure of DL&ULconfig. DL&ULconfig includes RNTI, DL_CH_ID, DL_MCS, DL_Start_Indicator, DL_Duration, DLPN, UL_CH_ID, UL_MCS, UL_Start_Indicator, UL_Duration, ULPN, and R. DL indicates a downlink and UL indicates an uplink. For meanings of the parameters in DL&ULconfig, refer to descriptions of DL config shown in FIG. 3 and UL config shown in FIG. 4, details are not described herein.

In the communications system, there are multiple methods used by the base station 10 to schedule the UE 11. Referring to FIG. 6, FIG. 6 is a scheduling process that is possibly used in a communications system. As shown in FIG. 6, the scheduling processing includes:

The base station 10 sends DCI (indicated by DCI: DL Alloc) that includes the downlink scheduling information of the UE 11 to the UE 11. Specifically, DCI: DL Alloc is used to indicate a time-frequency resource used when the base station 10 sends a downlink MAC PDU (indicated by DLPN 0) with a data packet number of 0.

The base station 10 sends DLPN 0 to the UE 11 by using the time-frequency resource indicated in the downlink scheduling information in DCI: DL Alloc. After receiving DCI: DL Alloc, the UE 11 receives DLPN 0 on the time-frequency resource indicated in the downlink scheduling information in DCI: DL Alloc.

The base station 10 sends DCI (indicated by DCI: UL Alloc) that includes the uplink scheduling information of the UE 11 to the UE 11. Specifically, DCI: UL Alloc is used to indicate a frequency resource used when the UE 11 sends uplink information (indicated by ULPN 0) with a data packet number of 0.

The UE 11 receives DCI: UL Alloc, and sends ULPN 0 to the base station 10 by using the time-frequency resource indicated in the uplink scheduling information in DCI: UL Alloc.

In the scheduling process shown in FIG. 6, each time the UE 11 is scheduled, the base station 10 needs to send DCI twice, and therefore scheduling signaling overheads are relatively large. The UE 11 needs to perform DCI reception and decoding twice, and each piece of DCI includes uplink/downlink/RACH scheduling information of multiple UEs. Therefore, overheads for the UE 11 to perform reception and decoding are relatively large.

Figure 7:
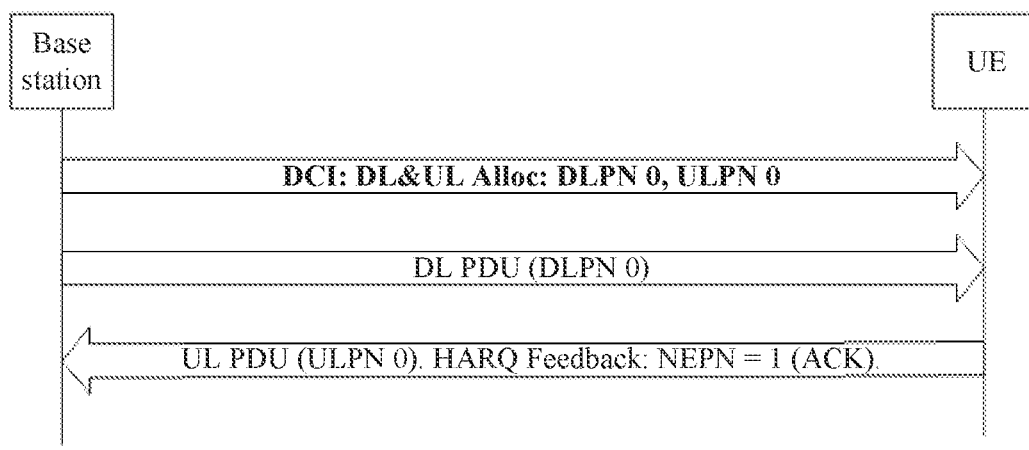
FIG. 7 is another scheduling process that is possibly used in a communications system.

For the foregoing problem, another scheduling process that is possibly used in the communications system is shown in FIG. 7. Referring to FIG. 7, the scheduling process includes:

The base station 10 sends DCI (indicated by DCI: DL&UL Alloc) that includes the downlink & uplink scheduling information of the UE 11 to the UE 11. Specifically, DCI: DL&UL Alloc is used to indicate a time-frequency resource used when the base station 10 sends DLPN 0 and a time-frequency resource used when the UE 11 sends ULPN 0.

The UE receives DCI: DL&UL Alloc, and receives DLPN 0 by using the time-frequency resource indicated in the downlink scheduling information in DCI: DL&UL Alloc, and sends ULPN 0 by using the time-frequency resource indicated in the uplink scheduling information in DCI: DL&UL Alloc.

In this way, in the scheduling process shown in FIG. 7, each time the UE is scheduled, the base station 10 needs to deliver DCI only once, and the UE needs to receive the DCI only once. However, actually, when sending the uplink information, the UE 11 needs to send only one bit of NEPN (Next PUD number). To schedule the one bit of NEPN, the base station 10 needs to send, for each UE, a total of 21 bits of downlink scheduling information including a channel frequency (6 bits), a transmission start time (4 bits), duration (6 bits), an MCS (4 bits), and an ULPN (1 bit), and signaling overheads are still relatively large.

To further reduce signaling overheads, in the communications system in this embodiment of the present invention, when scheduling UE, a base station sends uplink scheduling information to the UE by using DCI. The uplink scheduling information in the DCI is specifically indication information excluding at least one of an uplink MCS of the UE or information used to indicate duration for sending uplink information by the UE. For ease of description, a concept "specific parameter" is proposed in this specification. A specific parameter of the UE includes at least one of the uplink MCS of the UE or the information used to indicate duration for sending uplink information by the UE 11. The specific parameter of the UE is relatively stable, and the specific parameter may be added not to DCI sent each time when the base station schedules the UE, but to a system message with a relatively low sending frequency, and then sent to the UE, or may not be sent to the UE by using a system message, but be preset in the UE. In this way, signaling overheads may be further reduced when the UE is scheduled.

The base station 10 and the UE 11 in FIG. 1 are used as examples. For each scheduling process regarding the UE 11, reference may be made to FIG. 8 for understanding.

S1: The base station 10 determines uplink scheduling information of the UE 11.

There are multiple types of uplink scheduling information of the UE 11, and the uplink scheduling information may differ in different communications systems. For example, in NB M2M, the uplink scheduling information of the UE 11 includes an ID of the UE 11, an uplink MCS, information used to indicate duration for sending uplink information by the UE 11, a channel frequency at which the uplink information is sent, and a data packet number of a PDU in which the uplink information is sent, and information used to indicate a time at which the UE 11 sends the uplink information. Certainly, the foregoing are only examples of the uplink scheduling information and do not impose any limitation.

Specifically, the following describes the determining, by the base station 10, information that is used to indicate duration for sending uplink information by the UE 11 and that is in the uplink scheduling information of the UE 11. In this embodiment, the information used to indicate the duration for sending uplink information by the UE 11 includes a repetition factor for sending the uplink information or time duration for sending the uplink information. The repetition factor includes at least one of a quantity of repetition times or a spreading factor. Duration for sending a signal by the base station each time is fixed. Therefore, after receiving the repetition factor, the UE 11 may obtain, by multiplying the repetition factor and the duration for sending a signal by the base station each time, the duration for sending the uplink information.

Specifically, multiplication may be performed on the quantity of repetition times and the duration for sending a signal by the base station each time, or multiplication may be performed on the spreading factor and the duration for sending a signal by the base station each time, or multiplication may be performed on the quantity of repetition times, the spreading factor, and the duration for sending a signal by the base station each time.

There are multiple methods used by the base station 10 to determine the quantity of repetition times for sending the uplink information. For example, the quantity of repetition times is determined according to a distance between the base station 10 and the UE 11. Preferably, in this embodiment, the UE 11 may further determine a coverage level of the UE 11 according to a path loss between the UE 11 and the base station 10, and send the coverage level to the base station 10. The base station 10 determines, according to the coverage level, the quantity of repetition times for sending the uplink information by the UE 11.

For example, when the UE 11 is relatively close to the base station 10, the UE 11 determines the coverage level as "common coverage", and the base station 10 determines, according to the coverage level, that the quantity of repetition times for sending the uplink information by the UE 11 is 0.

When the UE 11 is relatively far from the base station 10, the UE 11 determines the coverage level as "edge coverage", and the base station 10 determines, according to the coverage level, that the quantity of repetition times for sending the uplink information by the UE 11 is 8 or 16.

When the UE 11 is in a scenario such as a basement, the UE 11 determines the coverage level as "extended overage", and the base station 10 determines, according to the coverage level, that the quantity of repetition times for sending the uplink information by the UE 11 may reach 32 or 64 or higher.

After the information used to indicate the duration for sending uplink information by the UE 11 is determined, the base station may determine an uplink MCS of the UE 11. A specific determining method is the prior art, which is not described herein. The base station may alternatively determine the uplink scheduling information of the UE according to another method, which is the prior art and is not described herein.

S2: The base station 10 sends a system message to the UE 11, where the system message carries the specific parameter.

The base station 10 broadcasts a system message to all UEs at intervals of a preset time. The preset time needs to be greater than a DCI interval. A position of the UE 11 generally keeps unchanged or the UE 11 moves at a relatively low speed, and therefore the uplink MCS of the UE 11 and the duration required for sending the uplink information may keep unchanged. In this way, when the base station 10 sends the uplink scheduling information to the UE 11, the specific parameter in the uplink scheduling information may be added not to DCI, but to a system message which is sent at a frequency lower than that of the DCI, and then sent to the UE 11.

In actual application, a specific parameter carried in a system message does not indicate specific UE, but is a specific parameter corresponding to a different level. After receiving the system message, each UE obtains, according to a level of the UE, a specific parameter corresponding to the level from the system message. For example, the level may be a coverage level, and the system message carries specific parameters respectively corresponding to different coverage levels. After receiving the system message, the UE obtains a corresponding specific parameter according to the coverage level of the UE.

S3: The UE 11 receives the system message and obtains the specific parameter from the system message.

The UE 11 obtains the specific parameter from the system message and stores the specific parameter. Before the UE 11 receives a system message next time, the UE 11 may send uplink information according to the stored specific parameter after receiving downlink data.

S4: The base station 10 sends DCI to the UE 11, where the DCI carries a portion of the uplink scheduling information of the UE 11.

In this embodiment, the portion of the uplink scheduling information of the UE 11 which is carried in the DCI refers to other indication information obtained after excluding the specific parameter of the UE 11 from the uplink scheduling information determined by the base station 10 in step S1.

S5: The UE 11 obtains the DCI sent by the base station 10, where the DCI carries the portion of the uplink scheduling information of the UE 11.

In this embodiment, the DCI includes the uplink scheduling information of the UE 11. Preferably, the DCI further includes downlink scheduling information of the UE 11. In this way, times of reception and decoding performed by the UE 11 may be reduced, and scheduling signaling overheads of the base station are decreased. Certainly, the downlink scheduling information of the UE 11 may also be added to in another piece of DCI for sending, which is not limited herein.

S6: The base station 10 sends downlink data to the UE 11.

There are multiple methods used by the base station 10 to send the DCI and the downlink data to the UE 11. For example, as described in the background, a repetition method or a method for sending a narrowband signal by means of Power Boosting is used to send the DCI and the downlink data. In this embodiment, preferably, the base station 10 uses a compromised method, that is, the base station 10 determines, according to the coverage level of the UE 11, the quantity of retransmission times of the UE 11 and whether Power Boosting is used to send a narrowband signal. For example, if the coverage level of the UE 11 is "common coverage", the base station 10 determines that the quantity of retransmission times is 0, and the method for sending a narrowband signal by means of Power Boosting is not used to transmit data. If the coverage level of the UE 11 is "edge coverage", the base station 10 determines that the quantity of retransmission times is 8 or 16, and the method for sending a narrowband signal by means of Power Boosting is not used to transmit data. If the coverage level of the UE 11 is "extended coverage", the base station 10 determines that the quantity of retransmission times may reach 32 or 64 or higher, and the method for sending a narrowband signal by means of Power Boosting is used to transmit data. In this way, the base station 10 selects, according to the coverage level, an appropriate quantity of transmission times and whether to use Power Boosting to send a narrowband signal. This can improve a probability that the UE 11 receives a signal and also reduce power overheads.

S7: The UE 11 obtains the downlink data.

S8: The UE 11 sends uplink information.

Specifically, the UE 1 sends uplink data according to the portion of the uplink scheduling information which is in the received DCI and a time-frequency resource indicated by the specific parameter in the received system message.

It should be noted that steps S2, S4, and S5 are not in a fixed time sequence.

In this embodiment, uplink scheduling information carried in DCI is other indication information excluding a specific parameter, and the specific parameter is sent to each UE by using a system message with a lower sending frequency. This can reduce overheads of signaling used to instruct UE to send uplink information. In addition, if multiple UEs are carried in the DCI, uplink scheduling information of each UE is decreased by at least several bits, and overheads of signaling used for uplink scheduling in the DCI can be greatly reduced, so that the DCI may carry more UE scheduling information, and a cell system capacity is improved. For the UE, decoding performed by the UE for a specific parameter in the DCI is avoided, reducing UE power consumption.

In this embodiment, the specific parameter in the uplink scheduling information of the UE 11 is carried in the system message and then sent to the UE 11. In some possible implementation manners of the present invention, the specific parameter may not be sent to the UE 1 by being added to the system message, but be preset in the UE 1. For example, a communications protocol specifies specific parameters in uplink scheduling information of UEs at different coverage levels. After determining the coverage level of the UE 11, the UE 11 may determine a specific parameter of the UE 11 according to the communications protocol. Alternatively, a communications protocol specifies other parameters. After determining the coverage level of the UE 11, the UE 11 may determine a specific parameter of the UE 11 according to these parameters. If the specific parameter is preset in the UE 11, in step S1 in this embodiment, when the base station determines the uplink scheduling information of the UE 11, the uplink scheduling information does not include the specific parameter.

In this embodiment, the other indication information that excludes the specific parameter and that is of the uplink scheduling information of the UE 11 is carried in the DCI, and then sent to the UE 11. In some possible embodiments of the present invention, preferably, there may further be two manners. In manner 1, in other indication information that excludes the specific parameter and that is of the uplink scheduling information of the UE 11, some indication information is carried in the DCI and the other portion of the indication information is carried in the downlink data, to be sent to the UE 11. In manner 2, all the other indication information that excludes the specific parameter and that is of the uplink scheduling information of the UE 11 is carried in the downlink data, and then sent to the UE 11. Both of the foregoing two manners can further reduce overheads of signaling used to instruct UE to send uplink information.

For example, in the foregoing two manners, the uplink scheduling information further includes at least one of a channel frequency at which the UE 11 sends the uplink information or a data packet number of a PDU in which the UE 11 sends the uplink information. At least one of the channel frequency at which the UE 11 sends the uplink information or the data packet number of a PDU in which the UE 11 sends the uplink information is included in the downlink data.

Figure 9:
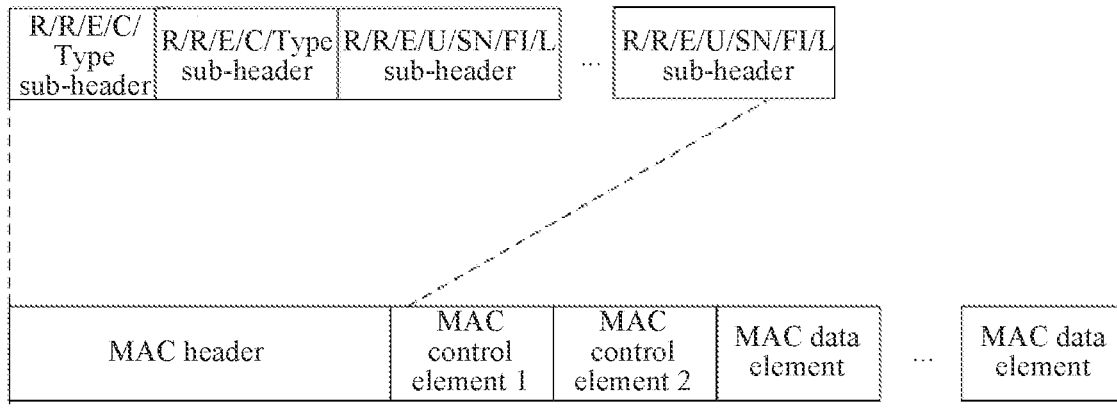
FIG. 9 is a schematic structural diagram of an embodiment of a MAC PDU.

In this embodiment, downlink data is sent by using a MAC PDU. The following briefly describes a structure of the MAC PDU. Referring to FIG. 9, FIG. 9 is a schematic structural diagram of an embodiment of a MAC PDU.

As shown in FIG. 9, the MAC PDU includes one MAC header, a MAC payload (not shown in the figure), zero or at least one MAC data element, and zero or at least one MAC control element.

Figure 10:
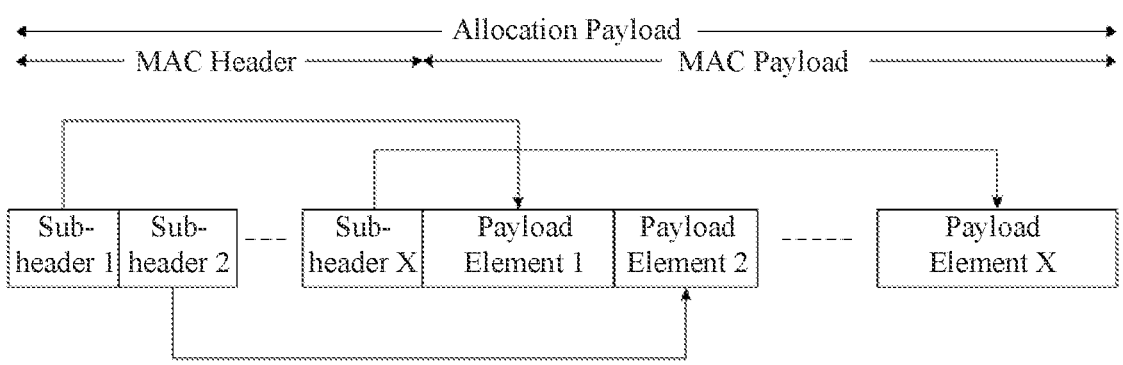
FIG. 10 is a schematic structural diagram of a MAC header and a MAC payload.

Referring to FIG. 10, FIG. 10 is a schematic structural diagram of a MAC header and a MAC payload. The MAC header includes a series of MAC sub-headers, used to indicate content carried in the MAC payload. The MAC payload includes a series of MAC data elements or MAC control elements. A quantity of the MAC sub-headers is the same as a quantity of the MAC payload elements, and the MAC sub-headers are in one-to-one correspondences with the MAC payload elements. Each MAC sub-header is used to define specific content of a MAC payload corresponding to the MAC sub-header.

In this embodiment, at least one of the channel frequency at which the UE 11 sends the uplink information or the data packet number of a PDU in which the UE 11 sends the uplink information is carried in a MAC data element or MAC control element in a MAC payload.

Specifically, at least one of a CH_ID field or a ULPN field is added to the MAC data element or the MAC control element in the MAC payload. The CH_ID field is used to indicate the channel frequency at which the UE 11 sends the uplink information, and the ULPN field is used to indicate the data packet number of a PDU in which the UE 11 sends the uplink information. In this way, when decoding downlink data, UE can obtain, by decoding a MAC data element or MAC control element in a MAC payload, a channel frequency and a data packet number of a PDU that are required for sending uplink information.

Optionally, in this embodiment, the uplink scheduling information of the UE 11 further includes information used to indicate a time at which the UE 11 sends the uplink information (hereinafter referred to as time information). There are multiple methods for sending the time information to the UE 11. A different sending method may be used when the time information includes different content. The following describes, by using examples, content included in the time information.

First type: The time information specifically includes an interval from a preset time point to the time at which the UE 11 sends the uplink information.

Second type: In step S4, the DCI sent by the base station 10 to the UE 11 may further carry a portion of uplink scheduling information of another UE. The UE 11 and the another UE form a UE set. The time information specifically includes a sequence number of the UE 11 in the UE set for sending the uplink information after a preset time point.

Third type: In step S4, the DCI sent by the base station 10 to the UE 11 may further carry the downlink scheduling information of the UE 11 and downlink scheduling information of another UE. The UE 11 and the another UE form a UE set. The time information specifically includes a sequence number of the UE 11 in the UE set for sending the uplink information after a preset time point.

In this embodiment, when the time information is the first type of time information, in the prior art, for each UE of UEs, a start time point at which uplink information is sent is indicated in the DCI, and therefore a relatively large quantity of bits is required. However, in this embodiment, even if the preset time point and a time interval for each UE are carried in the DCI, a preset time point may be indicated for each UE, and a time interval may be set for each UE by using a relatively small quantity of bits. Compared with the prior art, this embodiment enables signaling overheads of the DCI to be smaller.

When the time information is the second or third type of time information, in the DCI, a preset time point may be indicated for each UE in the UE set, and the time at which the UE 11 sends the uplink information is indicated by using the sequence number. Compared with the prior art in which a time at which each UE sends uplink information needs to be indicated in the DCI, this embodiment can reduce an amount of information carried in the DCI and decrease overheads of signaling used to instruct UE to send uplink information.

Optionally, the preset time points in the foregoing three types of time information may all include at least the following three types of time points, Type 1: The preset time point is a time point at which the UE 11 completes downlink data reception. Type 2: The preset time point is a time point at which the UE 11 starts to receive the downlink data. Type 3: The preset time point is a time point at which the UE receives the $k^{th}$ piece of DCI after the UE 11 receives, in step S5, the DCI sent by the base station 10, where k is an integer greater than 0. In a fourth type, the preset time point is a time point after preset duration since the UE receives the $k^{th}$ piece of DCI after the UE 1 receives, in step S5, the DCI sent by the base station 10, where k is an integer greater than 0.

Optionally, a time interval in the first type of time information may be an integer multiple of the DCI interval; or may be an integer multiple of unit time, where the unit time is a maximum time that is required for completing uplink information sending and that is specified in a communications protocol; or may be an integer multiple of unit time, where the integer multiple of the unit time is a minimum numeric value of preset multiples greater than the DCI interval; or may be another time interval.

Optionally, in the second type of time information, the sequence number of the UE 11 in the UE set for sending the uplink information may include: after uplink scheduling information of all UEs in the UE set is sorted in sequence in the DCI, the sequence number is a sequence number, in a normal order or a reverse order, of the uplink scheduling information of the UE 11 in the uplink scheduling information of all the UEs.

Optionally, in the third type of time information, the sequence number of the UE 11 in the UE set for sending the uplink information may include: after downlink scheduling information of all UEs in the UE set is sorted in sequence in the DCI, the sequence number is a sequence number, in a normal order or a reverse order, of the downlink scheduling information of the UE 11 in the downlink scheduling information of all the UEs.

Optionally, the preset time points in the three types of time information described in the foregoing may be a parameter received by the UE 11 from the DCI or the system message, or a parameter preset in the UE 11.

The first type of time information described in the foregoing may be a parameter received by the UE 11 from the DCI or the system message, or a parameter preset in the UE 11.

The second or third type of time information described in the foregoing may be a parameter received by the UE 11 from the DCI.

The foregoing describes a working process of the communications system in the present invention. For ease of understanding, the following gives specific examples about a method for carrying uplink scheduling information of UE.

The following describes a first example.

In this embodiment, the uplink scheduling information of the UE includes an ID of the UE, an uplink MCS, information used to indicate duration for sending uplink information by the UE, a channel frequency at which the uplink information is sent, a data packet number of a PDU in which the uplink information is sent, and information used to indicate a time at which the UE sends the uplink information.

In the uplink scheduling information of the UE, the uplink MCS, the information used to indicate duration for sending uplink information by the UE, and the information used to indicate a time at which the UE sends the uplink information are carried in a system message broadcast by a base station, and then are sent to the UE, and the channel frequency at which the uplink information is sent and the data packet number of a PDU in which the uplink information is sent are carried in downlink data sent by the base station, and then are sent to the UE.

In this embodiment, different DCI formats are classified in two cases. In a first case, the base station performs only uplink scheduling for the UE, and in a second case, the base station performs uplink scheduling and downlink scheduling at the same time for the UE.

In the first case, the base station performs only uplink scheduling for the UE. In the DCI shown in FIG. 2 to FIG. 5, the uplink scheduling information of the UE is carried in UL number and UL Allocation in the DCI. However, in this embodiment, UL number and UL Allocation may not be included in DCI, and the base station uses only DL Allocation to schedule the UE.

Figure 11:
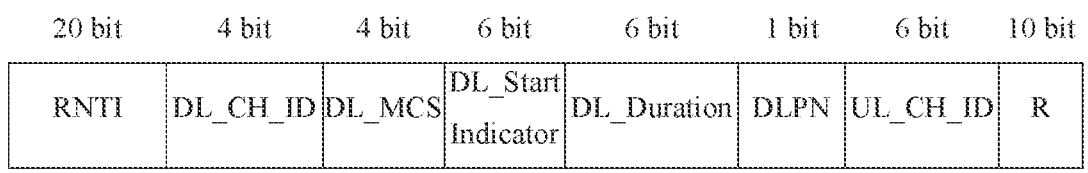
FIG. 11 is a schematic structural diagram of a DL&UL Allocation format in DCI according to an embodiment.

In the second case, the base station performs uplink scheduling and downlink scheduling at the same time for the UE. In the DCI shown in FIG. 2 to FIG. 5, the uplink scheduling information of the UE is carried in DL&UL number and DL&UL Allocation in the DCI. However, in this embodiment, the UL portions of DL&UL number and DL&UL Allocation in the DCI may not be included in DCI. For details, refer to FIG. 11. FIG. 11 is a schematic structural diagram of a format of DL&UL Allocation in the DCI in this embodiment.

In this embodiment, DL&UL Allocation includes RNTI, DL_CH_ID, DL_MCS, DL_Start_Indicator, DL_Duration, DLPN, UL_CH_ID, and R.

The following describes a second example.

In this embodiment, the uplink scheduling information of the UE includes an ID of the UE, an uplink MCS, information used to indicate duration for sending uplink information by the UE, a channel frequency at which the uplink information is sent, a data packet number of a PDU in which the uplink information is sent, and information used to indicate a time at which the UE sends the uplink information.

In the uplink scheduling information of the UE, the uplink MCS and the information used to indicate duration for sending uplink information by the UE are carried in a system message broadcast by a base station, and then are sent to the UE, and the channel frequency at which the uplink information is sent and the data packet number of a PDU in which the uplink information is sent are carried in downlink data sent by the base station, and then are sent to the UE. The information used to indicate a time at which the UE sends the uplink information and downlink scheduling information are carried in DCI, and then sent to the UE.

Figures 12, 13, 14, 15:
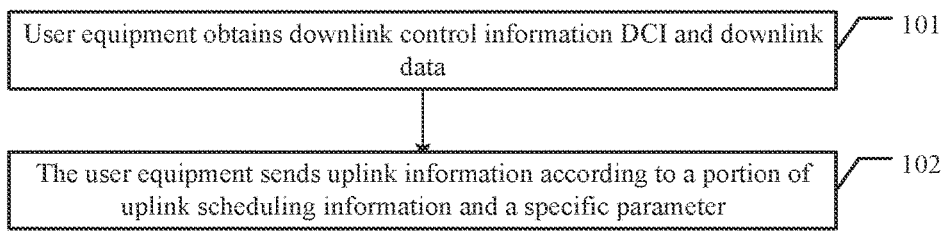
FIG. 12 is a schematic structural diagram of another embodiment of DCI according to an embodiment.
FIG. 13 is a schematic structural diagram of an embodiment of DL&UL Allocation in the DCI shown in FIG. 12.
FIG. 14 is a schematic structural diagram of an embodiment of DL Allocation in the DCI shown in FIG. 12.
FIG. 15 is a flowchart of an embodiment of an uplink information sending method according to an embodiment of the present invention.

Specifically, the information used to indicate a time at which the UE sends the uplink information includes an interval from a preset time point to the time at which the UE sends the uplink information. Referring to FIG. 12, FIG. 12 is schematic structural diagram of an embodiment of the DCI in this embodiment. The DCI includes R (reserved bit), DL number (quantity of UEs scheduled on a downlink), Feedback_Start_Indicator (preset time point), UL number (quantity of UEs scheduled on an uplink), DL&UL number (quantity of UEs scheduled on a downlink and an uplink at the same time), RACH number (quantity of UEs scheduled for RACH access), DL Allocation (downlink scheduling configuration), UL Allocation (uplink scheduling configuration), DL&UL Allocation (downlink and uplink scheduling configuration), RACH config (RACH scheduling configuration), and Padding (padding bit).

The base station specifies a preset time point Feedback_Start_Indicator for all UEs in UL number and DL&UL number in the DCI. Because the base station performs uplink scheduling and downlink scheduling at the same time for the UE, scheduling information of the UE is added to DL&UL Allocation in the DCI. The time interval in the time information of the UE may be added to DL&UL Allocation. As shown in FIG. 13, FIG. 13 is a schematic structural diagram of an embodiment of DL&UL Allocation in the DCI shown in FIG. 12. DL&UL Allocation includes RNTI, DL_CH_ID, DL_MCS, DL_Start_Indicator, DL_Duration, DLPN, UL_CH_ID, Feedback offset (time interval), and R.

Specifically, the preset time point is the $N^{th}$ frame that is after the UE receives the DCI. N is an integer greater than 0. Feedback offset may be used to instruct the UE to send the uplink information in the $x^{th}$ timeslot of the $N^{th}$ frame that is after the DCI is received. X is an integer greater than or equal to 0.

Alternatively, if DL&UL Allocation has only the downlink scheduling information and the time interval in the time information of the UE, the downlink scheduling information and the time interval in the time information of the UE may be added not to DL&UL Allocation in the DCI, but to DL Allocation in the DCI. As shown in FIG. 14, FIG. 14 is a schematic structural diagram of an embodiment of DL Allocation in the DCI shown in FIG. 12. DL Allocation includes RNTI, CH_ID, MCS, Start_Indicator, Duration, DLPN, Feedback offset, and R.

The following describes a third example.

In this embodiment, the uplink scheduling information of the UE includes an ID of the UE, an uplink MCS, information used to indicate duration for sending uplink information by the UE, a channel frequency at which the uplink information is sent, a data packet number of a PDU in which the uplink information is sent, and information used to indicate a time at which the UE sends the uplink information. A base station performs downlink scheduling and uplink scheduling at the same time for n UEs by using one piece of DCI, where n is an integer greater than 1. The n UEs form a first UE set.

In this embodiment, in uplink scheduling information of each UE in the first UE set, an uplink MCS and information used to indicate duration at which the UE sends uplink information are carried in a system message broadcast by the base station, and then are sent to the first UE set, and a channel frequency at which the uplink information is sent and a data packet number of a PDU in which the uplink information is sent are carried in downlink data sent by the base station, and then are sent to the first UE set. Information used to indicate a time at which each UE in the first UE set sends uplink information and downlink scheduling information are carried in DCI, and then are sent to the first UE set.

Time information of the first UE set specifically includes a preset time point and a sequence number of each UE in the first UE set for sending uplink information after the preset time point.

A schematic structural diagram of the DCI in this embodiment is the same as a schematic structural diagram of the DCI shown in FIG. 12, and details are not described herein. The base station specifies a preset time point Feedback_Start_Indicator for all UEs in UL number and DL&UL number in the DCI. For example, the preset time point may be the $N^{th}$ frame that is after the first UE set receives the DCI.

In this embodiment, downlink scheduling information of the first UE set is added not to DL&UL Allocation in the DCI, but to DL Allocation in the DCI, and downlink scheduling information of each UE in the first UE set is sorted in sequence in DL Allocation in the DCI. A sequence of the downlink scheduling information of all UEs in the first UE set is further used to indicate the sequence number of each UE for sending uplink information after the preset time point. For example, if downlink scheduling information of the $i^{th}$ UE in the first UE set is the $i^{th}$ one in a sequence of the downlink scheduling information of the first UE set, a time at which the $i^{th}$ UE sends uplink information is the $i^{th}$ timeslot of the $N^{th}$ frame that is after the DCI is received, where i=1, . . . , n.

The foregoing describes an entire working process of the communications system, and the following describes an uplink information sending method and a system scheduling method in the present invention.

Referring to FIG. 15, an uplink information sending method according to an embodiment of the present invention includes the following steps.

101: User equipment obtains downlink control information DCI and downlink data.

The user equipment in this embodiment of the present invention may be the UE 11 in FIG. 1.

At least one of the DCI or the downlink data carries a portion of uplink scheduling information of the user equipment, the uplink scheduling information is indication information required by the user equipment for sending uplink information, the uplink information is used to indicate whether the user equipment receives the downlink data correctly, the portion of the uplink scheduling information is specifically indication information excluding a specific parameter of the user equipment, and the specific parameter includes at least one of an uplink modulation and coding scheme MCS or information used to indicate duration for sending the uplink information.

102: The user equipment sends uplink information according to a portion of uplink scheduling information and a specific parameter.

The specific parameter is a parameter preset in the user equipment or a parameter received by the user equipment from a system message.

In this embodiment, uplink scheduling information carried in DCI is other indication information excluding a specific parameter, and the specific parameter is sent to each UE by using a system message with a lower sending frequency. This avoids decoding performed by the UE on a specific parameter in the DCI, and therefore reduces UE power consumption.

Optionally, on a basis of the embodiment corresponding to FIG. 15, in a first optional embodiment of the uplink information sending method provided in this embodiment of the present invention, the portion of the uplink scheduling information which is carried in the DCI or the specific parameter includes time information, where the time information is used to indicate a time at which the user equipment sends the uplink information; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Optionally, on a basis of the first optional embodiment, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of the uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

Optionally, on a basis of the first optional embodiment, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

Optionally, on a basis of the embodiment corresponding to FIG. 15, in a second optional embodiment of the uplink information sending method provided in this embodiment of the present invention, the portion of the uplink scheduling information of the user equipment which is carried in the downlink data specifically includes at least one of a channel frequency at which the uplink information is sent or a data packet number of a protocol data unit PDU in which the uplink information is sent.

Optionally, on a basis of the second optional embodiment, the downlink data is specifically a media access control MAC PDU, the MAC PDU includes a MAC payload, the MAC payload includes a MAC data element or a MAC control element, and the portion of the uplink scheduling information of the user equipment which is carried in the downlink data is specifically carried in the MAC data element or the MAC control element of the MAC payload.

Optionally, on a basis of the embodiment corresponding to FIG. 15, in a third optional embodiment of the uplink information sending method provided in this embodiment of the present invention, the information used to indicate duration for sending the uplink information specifically includes a repetition factor for sending the uplink information or time duration for sending the uplink information.

Optionally, on a basis of the embodiment corresponding to FIG. 15 or on a basis of any one of the optional embodiments of the embodiment corresponding to FIG. 15, in a fourth optional embodiment of the uplink information sending method provided in this embodiment of the present invention, the DCI further includes the downlink scheduling information, where the downlink scheduling information is used to schedule the user equipment to receive the downlink data;

the portion of the uplink scheduling information includes the channel frequency of the uplink information; and the specific parameter includes the uplink modulation and coding scheme MCS.

Optionally, on a basis of the embodiment corresponding to FIG. 15 or on a basis of any one of the optional embodiments of the embodiment corresponding to FIG. 15, in a fifth optional embodiment of the uplink information sending method provided in this embodiment of the present invention, the duration information of the uplink information is obtained by the user equipment from radio resource control RRC signaling; or the duration information of the uplink information is obtained by the user equipment from a mapping of a control parameter of the downlink data, where the control parameter of the downlink data includes at least one of the MCS of the downlink data or a quantity of retransmission times of the downlink data.

There is a specific correlation between an uplink channel and a downlink channel, and therefore the control parameter, of the downlink data, configured by a base station for the user equipment may reflect a current coverage status of the user equipment. Therefore, a rule may be set for mapping the control parameter of the downlink data onto the duration information of the uplink information, and the duration information of the uplink information may be directly obtained according to the mapping of the control parameter of the downlink data. No additional transmission is required.

For example, the duration information of the uplink information may be a quantity of retransmission times of the uplink information, the control parameter of the downlink data is the quantity of retransmission times of the downlink data, and the mapping rule is:

Quantity of retransmission times of uplink information=Quantity of retransmission times of downlink data×4

In the mapping rule, the user equipment first receives downlink scheduling DCI, obtains scheduling information of the downlink data from the downlink scheduling DCI, and parses out the control parameter from the scheduling information. For example, if the quantity of retransmission times of the downlink data may be set to 2 in the control parameter, the quantity of retransmission times of the uplink information is 8 according to the mapping rule.

Alternatively, the duration information of the uplink information is obtained by the user equipment from a resource mapping of a physical random access channel. The user equipment needs to use a PRACH resource to randomly connect to a base station in a network, and the base station may group PRACH resources into PRACH resource pools according to a coverage status, a geographical position, and the like that are of the user equipment. Therefore, a PRACH resource selected by the user equipment from a specific PRACH resource pool may also reflect a current coverage status of the user equipment, a rule may be set for mapping a PRACH resource onto the duration information of the uplink information, and the duration information of the uplink information may be directly obtained according to the PRACH resource mapping.

For example, the base station divides PRACH resources as follows:

resource pool 1: user equipment with good coverage or close to the base station;

resource pool 2: user equipment with poor coverage or far from the base station; and resource pool 3: user equipment with extremely poor coverage or at a cell edge.

The mapping rule is:
Quantity of retransmission times of uplink information=Sequence number of a resource pool in which a PRACH resource is located×4

The user equipment may obtain a quantity of retransmission times of the uplink information according to a PRACH resource used when the user equipment performs random access.

The duration information of the uplink information is used to indicate the quantity of retransmission times of the uplink information or the duration for sending the uplink information.

Figure 8:
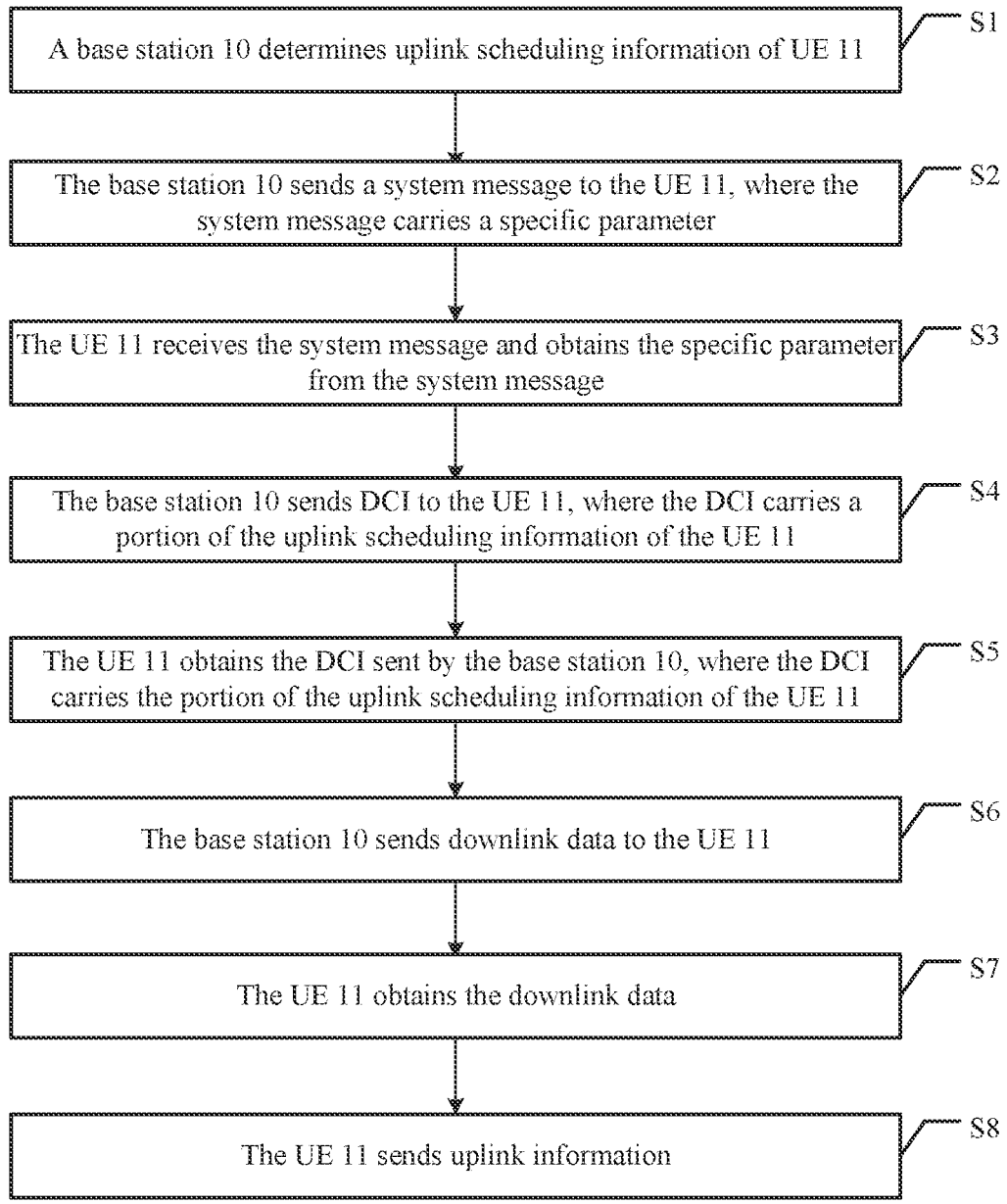
FIG. 8 is a scheduling process used in a communications system according to an embodiment of the present invention.

For the embodiment or optional embodiments corresponding to FIG. 15 in the present invention, reference may be made to descriptions about FIG. 8 for understanding, and details are not described herein.

Figure 16:
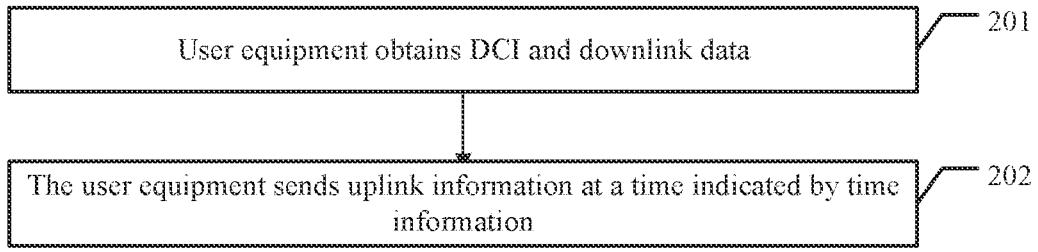
FIG. 16 is a flowchart of another embodiment of an uplink information sending method according to an embodiment of the present invention.

Referring to FIG. 16, an uplink information sending method according to an embodiment of the present invention includes the following steps.

201: User equipment obtains DCI and downlink data.

The DCI or a specific parameter includes time information, the time information is used to indicate a time at which the user equipment sends uplink information, the uplink information is used to indicate whether the user equipment receives the downlink data correctly, and the specific parameter is a parameter preset in the user equipment or a parameter received by the user equipment from a system message; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

202: The user equipment sends uplink information at a time indicated by time information.

Optionally, on a basis of the embodiment corresponding to FIG. 16, in a first optional embodiment of the uplink information sending method provided in this embodiment of the present invention, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of uplink scheduling information of the user equipment in the uplink scheduling information of all the user equipments in the user equipment set;
or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

Optionally, on a basis of the embodiment corresponding to FIG. 16, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the embodiment or optional embodiments corresponding to FIG. 16 in the present invention, reference may be made to descriptions about FIG. 8 for understanding, and details are not described herein.

Figure 17:
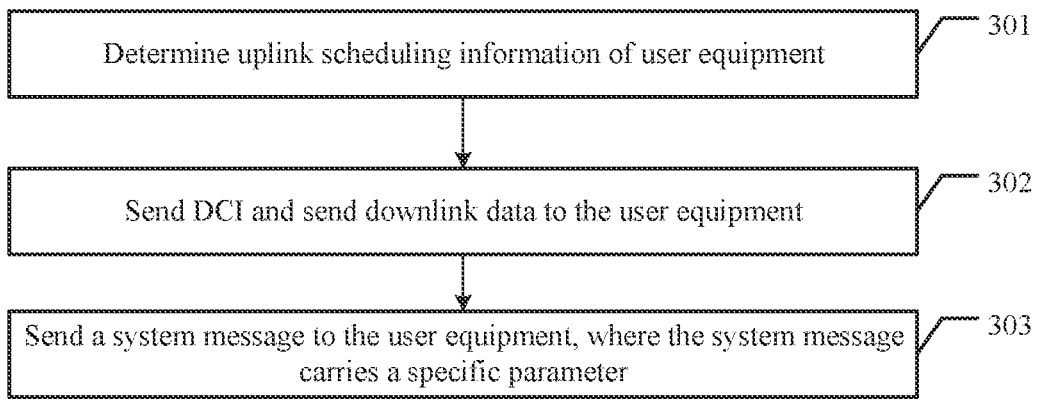
FIG. 17 is a flowchart of an embodiment of a system scheduling method according to an embodiment of the present invention.

Referring to FIG. 17, a system scheduling method according to an embodiment of the present invention includes the following steps.

301: Determine uplink scheduling information of user equipment.

The uplink scheduling information is indication information required by the user equipment for sending uplink information.

302: Send DCI and send downlink data to the user equipment.

At least one of the DCI or the downlink data carries a portion of the uplink scheduling information, the uplink information is used to indicate whether the user equipment receives the downlink data correctly, the portion of the uplink scheduling information is specifically indication information excluding a specific parameter of the user equipment, and the specific parameter includes at least one of an uplink modulation and coding scheme MCS or information used to indicate duration for sending the uplink information.

303: Send a system message to the user equipment, where the system message carries a specific parameter.

In this embodiment, uplink scheduling information carried in DCI is other indication information excluding a specific parameter, and the specific parameter is sent to each UE by using a system message with a lower sending frequency. This can reduce overheads of signaling used to instruct UE to send uplink information. In addition, if multiple UEs are carried in the DCI, uplink scheduling information of each UE is decreased by at least several bits, and overheads of signaling used for uplink scheduling in the DCI can be greatly reduced, so that the DCI may carry more UE scheduling information, and a cell system capacity is improved.

Optionally, on a basis of the embodiment corresponding to FIG. 17, in a first optional embodiment of the uplink information sending method provided in this embodiment of the present invention, the portion of the uplink scheduling information which is carried in the DCI or the specific parameter includes time information, where the time information is used to indicate a time at which the user equipment sends the uplink information; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Optionally, on a basis of the first optional embodiment, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of the uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

Optionally, on a basis of the first optional embodiment, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

Optionally, on a basis of the embodiment corresponding to FIG. 17, in a second optional embodiment of the uplink information sending method provided in this embodiment of the present invention, the portion of the uplink scheduling information of the user equipment which is carried in the downlink data specifically includes at least one of a channel frequency at which the uplink information is sent or a data packet number of a protocol data unit PDU in which the uplink information is sent.

Optionally, on a basis of the second optional embodiment, the downlink data is specifically a media access control MAC PDU, the MAC PDU includes a MAC payload, the MAC payload includes a MAC data element or a MAC control element, and the portion of the uplink scheduling information of the user equipment which is carried in the downlink data is specifically carried in the MAC data element or the MAC control element of the MAC payload.

Optionally, on a basis of the embodiment corresponding to FIG. 17, in a third optional embodiment of the uplink information sending method provided in this embodiment of the present invention, the information used to indicate duration for sending the uplink information specifically includes a repetition factor for sending the uplink information or time duration for sending the uplink information.

Optionally, on a basis of the embodiment corresponding to FIG. 17 or on a basis of any one of the optional embodiments of the embodiment corresponding to FIG. 17, in a fourth optional embodiment of the uplink information sending method provided in this embodiment of the present invention, the DCI further includes the downlink scheduling information, where the downlink scheduling information is used to schedule the user equipment to receive the downlink data;

the portion of the uplink scheduling information includes the channel frequency of the uplink information; and the specific parameter includes the uplink modulation and coding scheme MCS.

Optionally, on a basis of the embodiment corresponding to FIG. 17 or on a basis of any one of the optional embodiments of the embodiment corresponding to FIG. 17, in a fifth optional embodiment of the uplink information sending method provided in this embodiment of the present invention, the duration information of the uplink information is obtained by the user equipment from radio resource control RRC signaling; or the duration information of the uplink information is obtained by the user equipment from a mapping of a control parameter of the downlink data, and the control parameter of the downlink data includes at least one of the MCS of the downlink data or a quantity of retransmission times of the downlink data; or the duration information of the uplink information is obtained by the user equipment from a resource mapping of a physical random access channel; and the duration information of the uplink information is used to indicate a quantity of retransmission times of the uplink information or the duration for sending the uplink information.

For the embodiment or optional embodiments corresponding to FIG. 17 in the present invention, reference may be made to descriptions about FIG. 8 for understanding, and details are not described herein.

Figure 18:
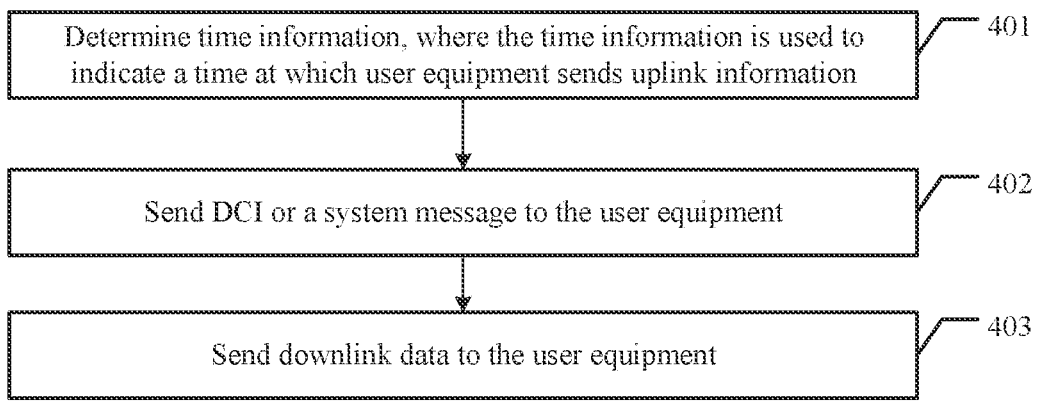
FIG. 18 is a flowchart of another embodiment of a system scheduling method according to an embodiment of the present invention.

Referring to FIG. 18, a system scheduling method according to an embodiment of the present invention includes the following steps:

401: Determine time information, where the time information is used to indicate a time at which user equipment sends uplink information.

402: Send DCI or a system message to the user equipment.

403: Send downlink data to the user equipment.

The DCI or the system message carries the time information, and the uplink information is used to indicate whether the user equipment receives the downlink data correctly; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Optionally, on a basis of the embodiment corresponding to FIG. 18, the scheduling information specifically includes uplink scheduling information, uplink scheduling information of all user equipments in the user equipment set is sorted in sequence in the DCI, and the sequence number for sending the uplink information is specifically determined according to a sequence number, in a normal order or a reverse order, of uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for sending the uplink information is specifically determined according to a sequence number, in a normal order or a reverse order, of downlink scheduling information of the user equipment in the downlink scheduling information of all the user equipments in the user equipment set.

Optionally, on a basis of the embodiment corresponding to FIG. 18, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the embodiment or optional embodiments corresponding to FIG. 18 in the present invention, reference may be made to descriptions about FIG. 8 for understanding, and details are not described herein.

In the foregoing descriptions, before sending downlink data to UE, a base station needs to send downlink scheduling information to the UE. The downlink scheduling information is indication information required by the UE for receiving the downlink data sent by the base station. After receiving the downlink data, the UE sends uplink information to the base station. The uplink information is used to indicate whether the UE correctly receives the downlink data sent by the base station. Before the UE sends the uplink information, the base station sends uplink scheduling information to the UE. The uplink scheduling information is indication information required by the UE for sending the uplink information. In the foregoing embodiments, a method for sending, to the UE by the base station, the uplink scheduling information used to instruct the UE to send the uplink information, and a method for obtaining, by the UE, the uplink scheduling information used to instruct the UE to send the uplink information are described.

Similarly, before UE sends uplink data to a base station, the base station needs to send uplink scheduling information to the UE. The uplink scheduling information is indication information required by the UE for sending the uplink data. After receiving the uplink data, the base station sends downlink information to the UE. The downlink information is used to indicate whether the base station correctly receives the uplink data sent by the UE. Before the base station sends the downlink information, the base station sends downlink scheduling information to the UE. The downlink scheduling information is indication information required by the UE for receiving the downlink information sent by the base station.

In the following embodiments, a method for sending, to the UE by the base station, the downlink scheduling information used to instruct the UE to receive the downlink information, and a method for obtaining, by the UE, the downlink scheduling information used to instruct the UE to receive the downlink information are described. The method for sending, to the UE by the base station, the downlink scheduling information used to instruct the UE to receive the downlink information is similar to the method for sending, to the UE by the base station, the uplink scheduling information used to instruct the UE to send the uplink information. The method for obtaining, by the UE, the downlink scheduling information used to instruct the UE to receive the downlink information is similar to the method for obtaining, by the UE, the uplink scheduling information used to instruct the UE to send the uplink information.

Figure 19:
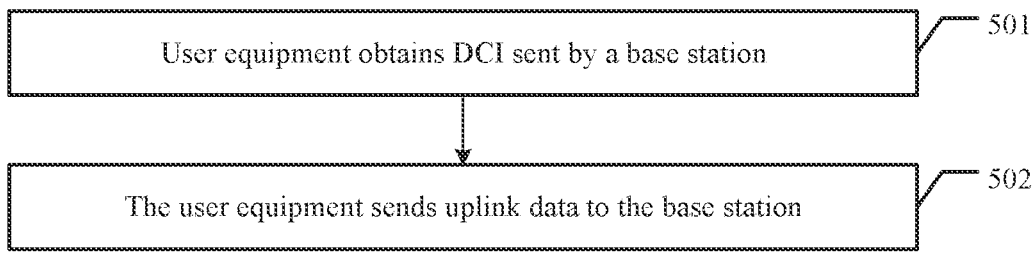
FIG. 19 is a flowchart of an embodiment of a downlink information receiving method according to an embodiment of the present invention.

Referring to FIG. 19, a downlink information receiving method according to an embodiment of the present invention includes the following steps:

501: User equipment obtains DCI sent by a base station.

502: The user equipment sends uplink data to the base station.

The DCI or a specific parameter includes time information, the specific parameter is a parameter preset in the user equipment or a parameter received by the user equipment from a system message, the time information is used to indicate a time at which the user equipment receives downlink information sent by the base station, and the downlink information is used to indicate whether the base station receives the uplink data correctly; and the time information specifically includes an interval from a preset time point to the time at which the downlink information is received; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for receiving the downlink information after a preset time point.

The preset time point is a parameter received by the user equipment from the DCI or the system message, or a parameter preset in the user equipment.

The user equipment receives the downlink information at the time indicated by the time information.

Optionally, on a basis of the embodiment corresponding to FIG. 19, the scheduling information specifically includes uplink scheduling information, uplink scheduling information of all user equipments in the user equipment set is sorted in sequence in the DCI, and the sequence number for receiving the downlink information is specifically determined according to a sequence number, in a normal order or a reverse order, of uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for receiving the downlink information is specifically a sequence number, in a normal order or a reverse order, of downlink scheduling information of the user equipment in the downlink scheduling information of all the user equipments in the user equipment set.

Optionally, on a basis of the embodiment corresponding to FIG. 19, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the embodiment or optional embodiments corresponding to FIG. 19 in the present invention, reference may be made to descriptions about FIG. 8 for understanding, and details are not described herein.

Figure 20:
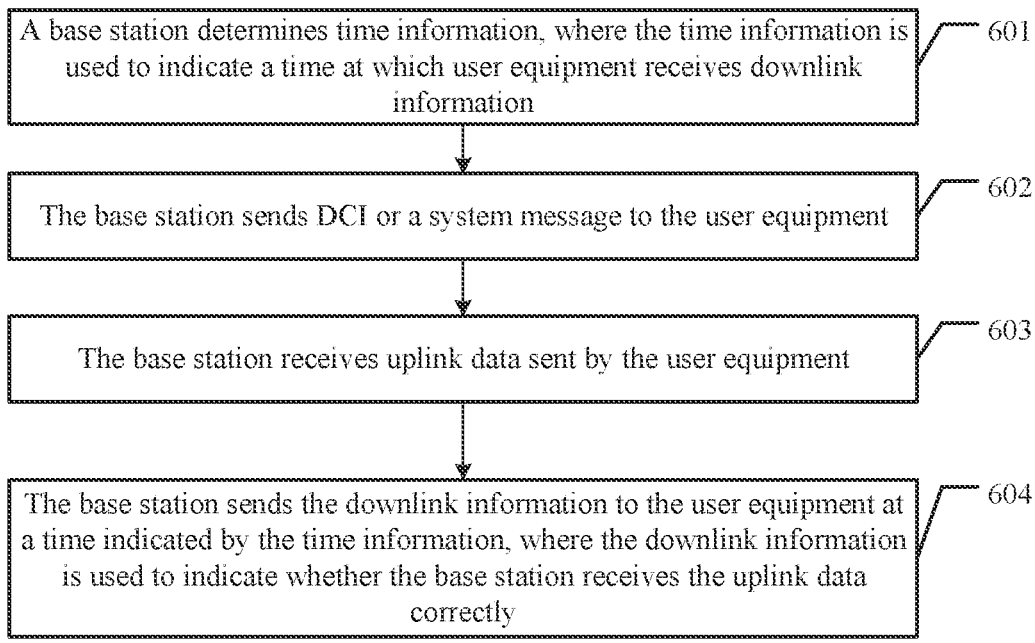
FIG. 20 is a flowchart of another embodiment of a downlink information receiving method according to an FIG. 21 is a schematic structural diagram of two embodiments of an uplink information sending apparatus according to an embodiment of the present invention.

Referring to FIG. 20, a downlink information sending method according to an embodiment of the present invention includes the following steps:

601: A base station determines time information, where the time information is used to indicate a time at which user equipment receives downlink information.

602: The base station sends DCI or a system message to the user equipment.

603: The base station receives uplink data sent by the user equipment.

604: The base station sends the downlink information to the user equipment at a time indicated by the time information, where the downlink information is used to indicate whether the base station receives the uplink data correctly.

The DCI or the system message carries the time information, and the time information specifically includes an interval from a preset time point to a time at which uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Optionally, on a basis of the embodiment corresponding to FIG. 20, the scheduling information specifically includes uplink scheduling information, uplink scheduling information of all user equipments in the user equipment set is sorted in sequence in the DCI, and the sequence number for receiving the downlink information is specifically determined according to a sequence number, in a normal order or a reverse order, of uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for receiving the downlink information is specifically determined according to a sequence number, in a normal order or a reverse order, of downlink scheduling information of the user equipment in the downlink scheduling information of all the user equipments in the user equipment set.

Optionally, on a basis of the embodiment corresponding to FIG. 20, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the embodiment or optional embodiments corresponding to FIG. 20 in the present invention, reference may be made to descriptions about FIG. 8 for understanding, and details are not described herein.

The foregoing describes the uplink information sending method, the downlink information receiving method, the system scheduling method, and the downlink information sending method in the embodiments of the present invention. The following describes an uplink information sending apparatus, a downlink information receiving apparatus, a system scheduling apparatus, and a downlink information sending apparatus in the embodiments of the present invention.

Figure 21:
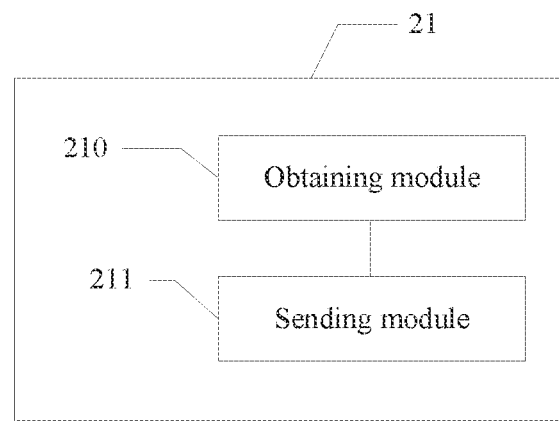

Referring to FIG. 21, an uplink information sending apparatus 21 of a first type according to an embodiment of the present invention includes an obtaining module 210 and a sending module 211.

The obtaining module 210 is configured to obtain downlink control information DCI and downlink data.

At least one of the DCI or the downlink data carries a portion of uplink scheduling information of the uplink information sending apparatus 21, the uplink scheduling information is indication information required by the uplink information sending apparatus 21 for sending uplink information, the uplink information is used to indicate whether the obtaining module 210 receives the downlink data correctly, the portion of the uplink scheduling information is specifically indication information excluding a specific parameter of the uplink information sending apparatus 21, and the specific parameter includes at least one of an uplink modulation and coding scheme MCS or information used to indicate duration for sending the uplink information.

The sending module 211 is configured to send the uplink information according to the portion of the uplink scheduling information and the specific parameter, where the specific parameter is a parameter preset in the uplink information sending apparatus 21 or a parameter received by the uplink information sending apparatus 21 from a system message.

In this embodiment, uplink scheduling information carried in DCI is other indication information excluding a specific parameter, and the specific parameter is sent to each uplink information sending apparatus by using a system message with a lower sending frequency. This avoids decoding performed by the uplink information sending apparatus on a specific parameter in the DCI, and therefore reduces power consumption of the uplink information sending apparatus.

Specifically, the uplink information sending apparatus 21 in this embodiment may be user equipment. For example, the uplink information sending apparatus 21 may be a mobile phone, a smartwatch, a tablet, a personal computer, a smart water/electric meter, a fire detection device, a logistics detection device, or another user equipment, which is not limited herein. Further, the obtaining module 210 may be a receiver in the user equipment, and the sending module 211 may be a transmitter in the user equipment.

Optionally, on a basis of the embodiment corresponding to FIG. 21, in a first optional embodiment of the uplink information sending apparatus provided in this embodiment of the present invention, the portion of the uplink scheduling information which is carried in the DCI or the specific parameter includes time information, where the time information is used to indicate a time at which the sending module sends the uplink information; and the time information specifically includes an interval from a preset time point to the time at which the uplink information is sent; or the DCI further carries scheduling information, excluding the time information, of the uplink information sending apparatus 21 and scheduling information of another uplink information sending apparatus, the uplink information sending apparatus 21 and the another uplink information sending apparatus form an uplink information sending apparatus set, and the time information carried in the DCI specifically includes a sequence number the uplink information sending apparatus 21 in the uplink information sending apparatus set for sending the uplink information after a preset time point.

The preset time point is a parameter received by the uplink information sending apparatus 21 from the DCI or the system message, or a parameter preset in the uplink information sending apparatus 21.

Optionally, on a basis of the first optional embodiment, the scheduling information specifically includes uplink scheduling information, uplink scheduling information of all uplink information sending apparatuses in the uplink information sending apparatus set is sorted in sequence in the DCI, and the sequence number for sending the uplink information is specifically a sequence number, in a normal order or a reverse order, of the uplink scheduling information of the uplink information sending apparatus 21 in the uplink scheduling information of all the uplink information sending apparatuses in the uplink information sending apparatus set;

or the scheduling information specifically includes downlink scheduling information, downlink scheduling information of all uplink information sending apparatuses in the uplink information sending apparatus set is sorted in sequence in the DCI, and the sequence number for sending the uplink information is specifically a sequence number, in a normal order or a reverse order, of downlink scheduling information of the uplink information sending apparatus 21 in the downlink scheduling information of all the uplink information sending apparatuses in the uplink information sending apparatus set.

Optionally, on a basis of the first optional embodiment, the preset time point is specifically a time point at which the obtaining module 210 completes downlink data reception, or is specifically a time point at which the obtaining module 210 starts to receive the downlink data, or is specifically a time point at which the obtaining module 210 receives the (preset numeric value)$^{th}$ piece of DCI after the DCI, or is specifically a time point after preset duration since the obtaining module 210 receives the (preset numeric value)$^{th}$ piece of DCI after the DCI.

Optionally, on a basis of the embodiment corresponding to FIG. 21, in a second optional embodiment of the uplink information sending apparatus provided in this embodiment of the present invention, the portion of the uplink scheduling information of the uplink information sending apparatus 21 which is carried in the downlink data specifically includes at least one of a channel frequency at which the uplink information is sent or a data packet number of a protocol data unit PDU in which the uplink information is sent.

Optionally, on a basis of the second optional embodiment, the downlink data is specifically a media access control MAC PDU, the MAC PDU includes a MAC payload, the MAC payload includes a MAC data element or a MAC control element, and the portion of the uplink scheduling information of the uplink information sending apparatus 21 which is carried in the downlink data is specifically carried in the MAC data element or the MAC control element of the MAC payload.

Optionally, on a basis of the embodiment corresponding to FIG. 21, in a third optional embodiment of the uplink information sending apparatus provided in this embodiment of the present invention, the information used to indicate duration for sending the uplink information specifically includes a repetition factor for sending the uplink information or time duration for sending the uplink information.

Optionally, on a basis of the embodiment corresponding to FIG. 21 or on a basis of any one of the optional embodiments of the embodiment corresponding to FIG. 21, in a fourth optional embodiment of the uplink information sending apparatus provided in this embodiment of the present invention, the DCI further includes the downlink scheduling information, where the downlink scheduling information is used to schedule the uplink information sending apparatus to receive the downlink data;

the portion of the uplink scheduling information includes the channel frequency of the uplink information; and the specific parameter includes the uplink modulation and coding scheme MCS.

Optionally, on a basis of the embodiment corresponding to FIG. 21 or on a basis of any one of the optional embodiments of the embodiment corresponding to FIG. 21, in a fifth optional embodiment of the uplink information sending apparatus provided in this embodiment of the present invention, the duration information of the uplink information is obtained by the uplink information sending apparatus from radio resource control RRC signaling; or the duration information of the uplink information is obtained by the uplink information sending apparatus from a mapping of a control parameter of the downlink data, and the control parameter of the downlink data includes at least one of the MCS of the downlink data or a quantity of retransmission times of the downlink data; or the duration information of the uplink information is obtained by the uplink information sending apparatus from a resource mapping of a physical random access channel; and the duration information of the uplink information is used to indicate a quantity of retransmission times of the uplink information or the duration for sending the uplink information.

For the described embodiment or optional embodiments corresponding to FIG. 21 in the present invention, reference may be made to descriptions about FIG. 8 and descriptions about FIG. 15 for understanding, and details are not described herein.

Referring to FIG. 21, an uplink information sending apparatus 21 of a second type according to an embodiment of the present invention includes an obtaining module 210 and a sending module 211.

The obtaining module 210 is configured to obtain DCI and downlink data.

The DCI or a specific parameter includes time information, where the time information is used to indicate a time at which the uplink information sending apparatus 21 sends uplink information, the uplink information is used to indicate whether the obtaining module 210 receives the downlink data correctly, and the specific parameter is a parameter preset in the uplink information sending apparatus 21 or a parameter received by the uplink information sending apparatus 21 from a system message; and the time information specifically includes an interval from a preset time point to the time at which the uplink information is sent; or the DCI further carries scheduling information, excluding the time information, of the uplink information sending apparatus 21 and scheduling information of another uplink information sending apparatus, the uplink information sending apparatus 21 and the another uplink information sending apparatus form an uplink information sending apparatus set, and the time information carried in the DCI specifically includes a sequence number of the uplink information sending apparatus 21 in the uplink information sending apparatus set for sending the uplink information after a preset time point.

The preset time point is a parameter received by the uplink information sending apparatus 21 from the DCI or the system message, or a parameter preset in the uplink information sending apparatus 21.

The sending module 211 is configured to send the uplink information at the time indicated by the time information.

Specifically, the uplink information sending apparatus 21 in this embodiment may be user equipment. For example, the uplink information sending apparatus 21 may be a mobile phone, a smartwatch, a tablet, a personal computer, a smart water/electric meter, a fire detection device, a logistics detection device, or another user equipment, which is not limited herein. Further, the obtaining module 210 may be a receiver in the user equipment, and the sending module 211 may be a transmitter in the user equipment.

Optionally, on a basis of the embodiment of the uplink information sending apparatus 21 of the second type corresponding to FIG. 21, the scheduling information specifically includes uplink scheduling information, uplink scheduling information of all uplink information sending apparatuses in the uplink information sending apparatus set is sorted in sequence in the DCI, and the sequence number for sending the uplink information is specifically a sequence number, in a normal order or a reverse order, of uplink scheduling information of the uplink information sending apparatus 21 in the uplink scheduling information of all the uplink information sending apparatuses in the uplink information sending apparatus set;

or the scheduling information specifically includes downlink scheduling information, downlink scheduling information of all uplink information sending apparatuses in the uplink information sending apparatus set is sorted in sequence in the DCI, and the sequence number for sending the uplink information is specifically a sequence number, in a normal order or a reverse order, of downlink scheduling information of the uplink information sending apparatus 21 in the downlink scheduling information of all the uplink information sending apparatuses in the uplink information sending apparatus set.

Optionally, on a basis of the embodiment of the uplink information sending apparatus 21 of the second type corresponding to FIG. 21, the preset time point is specifically a time point at which the uplink information sending apparatus 21 completes downlink data reception, or is specifically a time point at which the uplink information sending apparatus 21 starts to receive the downlink data, or is specifically a time point at which the uplink information sending apparatus 21 receives the (preset numeric value)$^{th}$ piece of DCI after the DCI, or is specifically a time point after preset duration since the uplink information sending apparatus 21 receives the (preset numeric value)$^{th}$ piece of DCI after the DCI.

For the described embodiment or optional embodiments of the uplink information sending apparatus 21 of the second type corresponding to FIG. 21 in the present invention, reference may be made to descriptions about FIG. 8 and descriptions about FIG. 16 for understanding, and details are not described herein.

Figure 22:
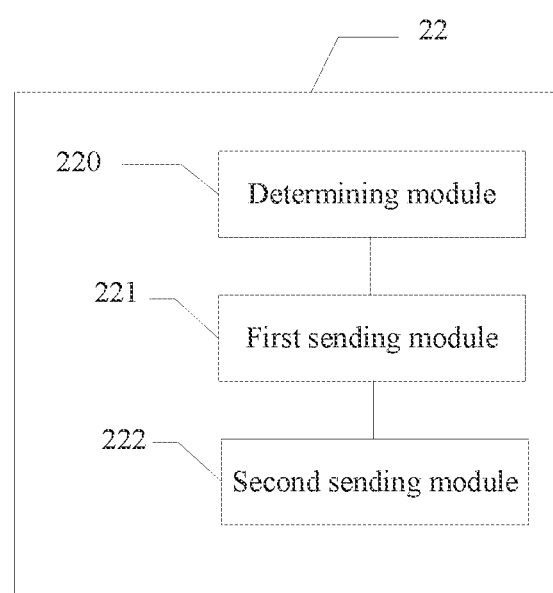
FIG. 22 is a schematic structural diagram of two embodiments of a system scheduling apparatus according to an embodiment of the present invention.

Referring to FIG. 22, a system scheduling apparatus 22 according to an embodiment of the present invention includes: a determining module 220, a first sending module 221, and a second sending module 222.

The determining module 220 is configured to determine uplink scheduling information of user equipment, where the uplink scheduling information is indication information required by the user equipment for sending uplink information.

The first sending module 221 is configured to send DCI and send downlink data to the user equipment.

At least one of the DCI or the downlink data carries a portion of the uplink scheduling information, the uplink information is used to indicate whether the user equipment receives the downlink data correctly, the portion of the uplink scheduling information is specifically indication information excluding a specific parameter of the user equipment, and the specific parameter includes at least one of an uplink modulation and coding scheme MCS or information used to indicate duration for sending the uplink information.

The second sending module 222 is configured to send a system message to the user equipment, where the system message carries the specific parameter.

In this embodiment, uplink scheduling information carried in DCI is other indication information excluding a specific parameter, and the specific parameter is sent to each UE by using a system message with a lower sending frequency. This can reduce overheads of signaling used to instruct UE to send uplink information. In addition, if multiple UEs are carried in the DCI, uplink scheduling information of each UE is decreased by at least several bits, and overheads of signaling used for uplink scheduling in the DCI can be greatly reduced, so that the DCI may carry more UE scheduling information, and a cell system capacity is improved.

Specifically, the system scheduling apparatus 22 in this embodiment may be a base station. For example, the system scheduling apparatus 22 may be a base station in NB M2M, which is not limited herein. Further, the determining module 220 may be a scheduling control module in a media access control module in the base station, and the first sending module 221 and the second sending module 222 may be transmitters in the base station, which are not limited herein.

Optionally, on a basis of the embodiment corresponding to FIG. 22, in a first optional embodiment of the system scheduling apparatus provided in this embodiment of the present invention, the portion of the uplink scheduling information which is carried in the DCI or the specific parameter includes time information, where the time information is used to indicate a time at which the user equipment sends the uplink information; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Optionally, on a basis of the first optional embodiment, the scheduling information specifically includes uplink scheduling information, uplink scheduling information of all user equipments in the user equipment set is sorted in sequence in the DCI, and the sequence number for sending the uplink information is specifically a sequence number, in a normal order or a reverse order, of the uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for sending the uplink information is specifically a sequence number, in a normal order or a reverse order, of downlink scheduling information of the user equipment in the downlink scheduling information of all the user equipments in the user equipment set.

Optionally, on a basis of the first optional embodiment, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

Optionally, on a basis of the embodiment corresponding to FIG. 22, in a second optional embodiment of the system scheduling apparatus provided in this embodiment of the present invention, the portion of the uplink scheduling information of the user equipment which is carried in the downlink data specifically includes at least one of a channel frequency at which the uplink information is sent or a data packet number of a protocol data unit PDU in which the uplink information is sent.

Optionally, on a basis of the second optional embodiment, the downlink data is specifically a media access control MAC PDU, the MAC PDU includes a MAC payload, the MAC payload includes a MAC data element or a MAC control element, and the portion of the uplink scheduling information of the user equipment which is carried in the downlink data is specifically carried in the MAC data element or the MAC control element of the MAC payload.

Optionally, on a basis of the embodiment corresponding to FIG. 22, in a third optional embodiment of the system scheduling apparatus provided in this embodiment of the present invention, the information used to indicate duration for sending the uplink information specifically includes a repetition factor for sending the uplink information or time duration for sending the uplink information.

Optionally, on a basis of the embodiment corresponding to FIG. 22 or on a basis of any one of the optional embodiments of the embodiment corresponding to FIG. 22, in a fourth optional embodiment of the system scheduling apparatus provided in this embodiment of the present invention, the DCI further includes the downlink scheduling information, where the downlink scheduling information is used to schedule the user equipment to receive the downlink data;

the portion of the uplink scheduling information includes the channel frequency of the uplink information; and the specific parameter includes the uplink modulation and coding scheme MCS.

Optionally, on a basis of the embodiment corresponding to FIG. 22 or on a basis of any one of the optional embodiments of the embodiment corresponding to FIG. 22, in a fifth optional embodiment of the system scheduling apparatus provided in this embodiment of the present invention, the duration information of the uplink information is obtained by the user equipment from radio resource control RRC signaling; or the duration information of the uplink information is obtained by the user equipment from a mapping of a control parameter of the downlink data, and the control parameter of the downlink data includes at least one of the MCS of the downlink data or a quantity of retransmission times of the downlink data; or the duration information of the uplink information is obtained by the user equipment from a resource mapping of a physical random access channel; and the duration information of the uplink information is used to indicate a quantity of retransmission times of the uplink information or the duration for sending the uplink information.

For the embodiment or optional embodiments corresponding to FIG. 22 in the present invention, reference may be made to descriptions about FIG. 8 and descriptions about FIG. 17 for understanding, and details are not described herein.

Referring to FIG. 22, a system scheduling apparatus 22 of a second type according to an embodiment of the present invention includes:

a determining module 220, configured to determine time information, where the time information is used to indicate a time at which user equipment sends uplink information;

a first sending module 221, configured to send DCI or a system message to the user equipment; and a second sending module 222, configured to send downlink data to the user equipment.

The DCI or the system message carries the time information, and the uplink information is used to indicate whether the user equipment receives the downlink data correctly; and the time information specifically includes an interval from a preset time point to the time at which the uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Specifically, the system scheduling apparatus 22 in this embodiment may be a base station. For example, the system scheduling apparatus 22 may be a base station in NB M2M, which is not limited herein. Further, the determining module 220 may be a scheduling control module in a media access control module in the base station, and the first sending module 221 and the second sending module 222 may be transmitters in the base station, which are not limited herein.

Optionally, on a basis of the embodiment of the system scheduling apparatus 22 of the second type corresponding to FIG. 22, the scheduling information specifically includes uplink scheduling information, uplink scheduling information of all user equipments in the user equipment set is sorted in sequence in the DCI, and the sequence number for sending the uplink information is specifically determined according to a sequence number, in a normal order or a reverse order, of uplink scheduling information of the user equipment in the uplink scheduling information of all the user equipments in the user equipment set;

or the scheduling information specifically includes downlink scheduling information, downlink scheduling information of all user equipments in the user equipment set is sorted in sequence in the DCI, and the sequence number for sending the uplink information is specifically determined according to a sequence number, in a normal order or a reverse order, of downlink scheduling information of the user equipment in the downlink scheduling information of all the user equipments in the user equipment set.

Optionally, on a basis of the embodiment of the system scheduling apparatus 22 of the second type corresponding to FIG. 22, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the described embodiment or optional embodiments of the system scheduling apparatus 22 of the second type corresponding to FIG. 22 in the present invention, reference may be made to descriptions about FIG. 8 and descriptions about FIG. 18 for understanding, and details are not described herein.

Figure 23:
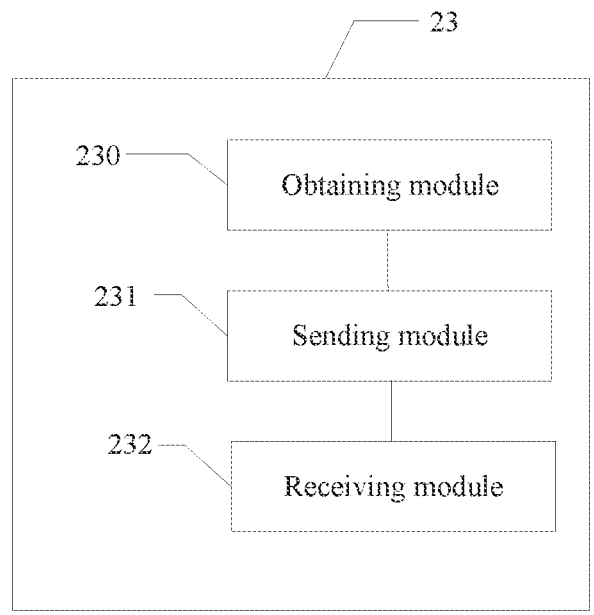
FIG. 23 is a schematic structural diagram of an embodiment of a downlink information receiving apparatus according to an embodiment of the present invention.

Referring to FIG. 23, a downlink information receiving apparatus 23 according to an embodiment of the present invention includes an obtaining module 230, a sending module 231, and a receiving module 232.

The obtaining module 230 is configured to obtain DCI sent by a base station.

The sending module 231 is configured to send uplink data to the base station.

The DCI or a specific parameter includes time information, the specific parameter is a parameter preset in the downlink information receiving apparatus 23 or a parameter received by the downlink information receiving apparatus 23 from a system message, the time information is used to indicate a time at which the downlink information receiving apparatus 23 receives downlink information sent by the base station, and the downlink information is used to indicate whether the base station receives the uplink data correctly; and the time information specifically includes an interval from a preset time point to the time at which the downlink information is received; or the DCI further carries scheduling information, excluding the time information, of the downlink information receiving apparatus 23 and scheduling information of another downlink information receiving apparatus, the downlink information receiving apparatus 23 and the another downlink information receiving apparatus form a downlink information receiving apparatus set, and the time information carried in the DCI specifically includes a sequence number of the downlink information receiving apparatus 23 in the downlink information receiving apparatus set for receiving the downlink information after a preset time point.

The preset time point is a parameter received by the downlink information receiving apparatus 23 from the DCI or the system message, or a parameter preset in the downlink information receiving apparatus 23.

The receiving module 232 is configured to receive the downlink information at the time indicated by the time information.

Specifically, the downlink information receiving apparatus 23 in this embodiment may be user equipment. For example, the downlink information receiving apparatus 23 may be a mobile phone, a smartwatch, a tablet, a personal computer, a smart water/electric meter, a fire detection device, a logistics detection device, or another user equipment, which is not limited herein. Further, the obtaining module 230 and the receiving module 232 may be receivers in the user equipment, and the sending module 231 may be a transmitter in the user equipment, which are not limited herein.

Optionally, on a basis of the embodiment corresponding to FIG. 23, the scheduling information specifically includes uplink scheduling information, uplink scheduling information of all downlink information receiving apparatuses in the downlink information receiving apparatus set is sorted in sequence in the DCI, and the sequence number for receiving the downlink information is specifically determined according to a sequence number, in a normal order or a reverse order, of uplink scheduling information of the downlink information receiving apparatus in the uplink scheduling information of all the downlink information receiving apparatuses in the downlink information receiving apparatus set;
or
the scheduling information specifically includes downlink scheduling information, downlink scheduling information of all downlink information receiving apparatuses in the downlink information receiving apparatus set is sorted in sequence in the DCI, and the sequence number for receiving the downlink information is specifically a sequence number, in a normal order or a reverse order, of downlink scheduling information of the downlink information receiving apparatus in the downlink scheduling information of all the downlink information receiving apparatuses in the downlink information receiving apparatus set.

Optionally, on a basis of the embodiment corresponding to FIG. 23, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the embodiment or optional embodiments corresponding to FIG. 23 in the present invention, reference may be made to descriptions about FIG. 8 and descriptions about FIG. 19 for understanding, and details are not described herein.

Figure 24:
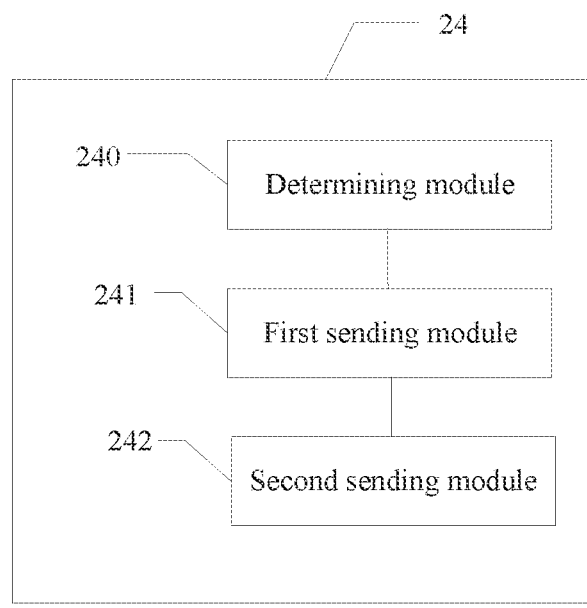
FIG. 24 is a schematic structural diagram of an embodiment of a downlink information sending apparatus according to an embodiment of the present invention.

Referring to FIG. 24, a downlink information sending apparatus 24 according to an embodiment of the present invention includes:

a determining module 240, configured to determine time information, where the time information is used to indicate a time at which user equipment receives downlink information;

a first sending module 241, configured to send DCI or a system message to the user equipment;

a receiving module, configured to receive uplink data sent by the user equipment; and a second sending module 242, configured to send the downlink information to the user equipment at a time indicated by the time information, where the downlink information is used to indicate whether the receiving module receives the uplink data correctly.

The DCI or the system message carries the time information, and the time information specifically includes an interval from a preset time point to a time at which uplink information is sent; or the DCI further carries scheduling information, excluding the time information, of the user equipment and scheduling information of another user equipment, the user equipment and the another user equipment form a user equipment set, and the time information carried in the DCI specifically includes a sequence number of the user equipment in the user equipment set for sending the uplink information after a preset time point.

The preset time point is a parameter received by the user equipment from the DCI or the system message, or a parameter preset in the user equipment.

Specifically, the downlink information sending apparatus 24 in this embodiment may be a base station. For example, the downlink information sending apparatus 24 may be a base station in NB M2M, which is not limited herein. Further, the determining module 240 may be a scheduling control module in a media access control module in the base station, and the first sending module 241 and the second sending module 242 may be transmitters in the base station, which are not limited herein.

Optionally, on a basis of the embodiment corresponding to FIG. 24, the scheduling information specifically includes uplink scheduling information, uplink scheduling information of all user equipments in the user equipment set is sorted in sequence in the DCI, and the sequence number for receiving the downlink information is specifically determined according to a sequence number, in a normal order or a reverse order, of uplink scheduling information of the user equipment in the uplink scheduling information of all the user equipments in the user equipment set;
or
the scheduling information specifically includes downlink scheduling information, downlink scheduling information of all user equipments in the user equipment set is sorted in sequence in the DCI, and the sequence number for receiving the downlink information is specifically determined according to a sequence number, in a normal order or a reverse order, of downlink scheduling information of the user equipment in the downlink scheduling information of all the user equipments in the user equipment set.

Optionally, on a basis of the embodiment corresponding to FIG. 24, the preset time point is specifically a time point at which the user equipment completes downlink data reception, or is specifically a time point at which the user equipment starts to receive the downlink data, or is specifically a time point at which the user equipment receives the (preset numeric value)$^{th}$ piece of DCI after the DCI, or is specifically a time point after preset duration since the user equipment receives the (preset numeric value)$^{th}$ piece of DCI after the DCI.

For the embodiment or optional embodiments corresponding to FIG. 24 in the present invention, reference may be made to descriptions about FIG. 8 and descriptions about FIG. 20 for understanding, and details are not described herein.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Figure 25:
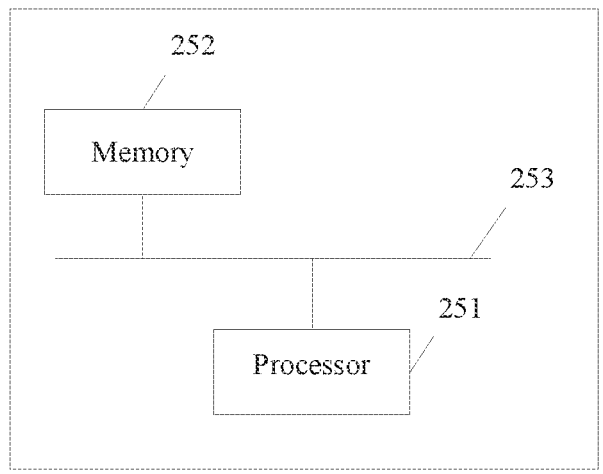
FIG. 25 is a schematic structural diagram of a device according to an embodiment of the present invention.

Specifically, reference may be made to a schematic diagram of a device provided in FIG. 25 according to an embodiment of the present invention. The device includes a processor 251 and a memory 252. The processor 251 and the memory 252 are connected by using a system bus 253. The memory 252 stores driver software, which may specifically be wireless communications protocol software, such as global system for mobile communications (GSM), Universal Mobile Telecommunications System (UMTS), Worldwide Interoperability for Microwave Access (WiMAX), or Long Term Evolution (LTE) protocol software. Driven by the memory 252, the processor 251 may implement a function of a wireless communications protocol to schedule, send, or receive wireless communication data, so as to execute an operation process in any one or multiple method embodiments, thereby reducing instruction overheads and deceasing power consumption during device execution.

Figure 26:
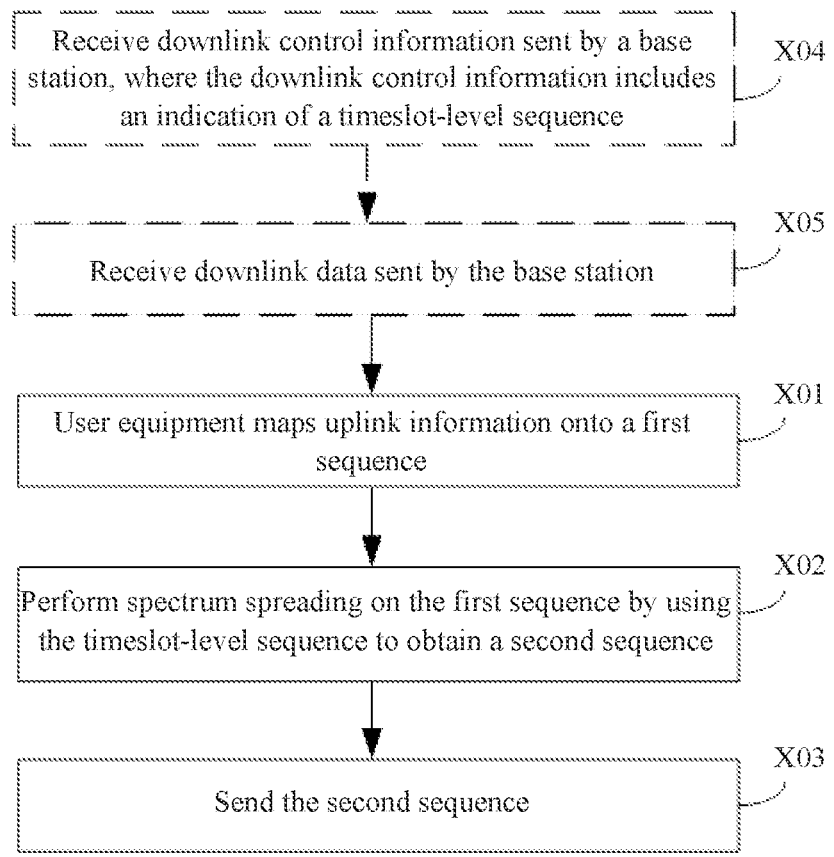
FIG. 26 is a schematic diagram of another uplink information sending method according to an embodiment of the present invention.
Figure 27:
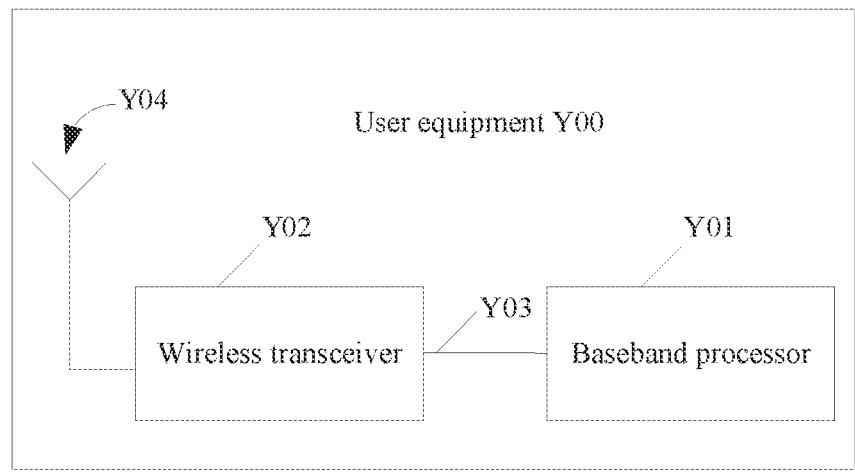
FIG. 27 is a schematic diagram of another user equipment configured to send uplink information according to an embodiment of the present invention.

For another embodiment of the present invention, refer to FIG. 26 and FIG. 27. As described in FIG. 26, an uplink information sending method in the another embodiment of the present invention may include the following steps.

X01: User equipment maps uplink information onto a first sequence. This step may be performed by a baseband processor Y01 in the user equipment. The uplink information is a signal sent from the user equipment to a base station, and downlink information is information sent from the base station to the user equipment.

The uplink information is used to indicate whether the user equipment correctly receives downlink data sent by the base station. The uplink information may be an ACK or NACK. For example, information in the ACK or NACK may be mapped onto the first sequence with a preset length. The preset length may be a fixed length. The first sequence is a symbol-level sequence, that is, a sequence value of each uplink sending symbol of the first sequence may change. In other words, the first sequence is a series of numeric values, each numeric value corresponds to one symbol, and the numeric value is also referred to as a sequence value. The first sequence may be a Walsh sequence, a Zardoff-Chu sequence, a pseudo-random sequence, another sequence, or a sequence generated based on transformation of these sequences. A length of the first sequence may be any value such as 8, 14, or 32, which is not limited in this embodiment of the present invention. A symbol, subframe, or timeslot in this embodiment is a time unit. Generally, one subframe or timeslot may include multiple symbols. The symbol may be an OFDM (orthogonal frequency division multiplexing) symbol. The uplink information may be an ACK or NACK, or may be a scheduling request (SR) or a channel quality indicator (CQI). In this embodiment, an ACK/NACK in a HARQ (hybrid automatic repeat request) is subsequently used as an example for description.

For example, the first sequence may be generated by means of spectrum spreading by using an orthogonal variable spreading factor code (OVSF code). The orthogonal variable spreading factor code corresponds to an orthogonal sequence, such as a Walsh sequence. A sequence length of 8 is used as an example. An orthogonal code corresponding to the Walsh sequence is $-1,-1,1, 1, -1, -1, 1, 1$. A mapping relationship from the uplink information to the first sequence may be as follows:

ACK: a sequence $\{-1,-1, 1, 1, -1, -1, 1, 1\}$ generated based on an OVSF code 3

NACK: 1, 1, $-1$, $-1$, 1, 1, $-1$, $-1$

That is, it is specified by using a preset mapping rule that spectrum spreading is performed for the ACK information of the user equipment by using the OVSF code 3, to generate the sequence $\{-1,-1,1,1, -1, -1,1,1\}$. Therefore, the user equipment may perform spectrum spreading for the NACK information by using the OVSF code 3 to obtain the sequence $\{1, 1, -1, -1,1, 1, -1, -1\}$. "$-1$" and "1" indicate sequence values of all symbols of the first sequence.

Optionally, after obtaining the first sequence, the user equipment maps the first sequence onto a sequence obtained after modulation, that is, a modulated sequence, and inserts an uplink reference signal between sequence values in the modulated sequence to obtain the first sequence with a reference signal. The first sequence with a reference signal is also referred to as an integrated modulated sequence. The uplink reference signal is used by the base station to perform uplink channel estimation.

For example, in a communications system, each subframe has two timeslots, and each timeslot includes seven symbols. The user equipment inserts three uplink reference signal symbols between sequence values corresponding to every four symbols of the first sequence, and a total of seven symbols are obtained. For example, the user equipment maps the ACK information onto the first sequence $\{-1,-1, 1, 1, -1, -1, 1, 1\}$ by using the preset mapping rule. Specifically, binary phase shift keying (BPSK) may be used to modulate each bit of information of the first sequence to obtain a modulated sequence $\{-1,-1, 1, 1, -1, -1,1,1\}$. Sequence values corresponding to every four symbols may be divided into two groups: $\{(-1,-1,1,1), (-1,-1,1,1)\}$. It is assumed that an uplink reference signal symbol is $\{-1, -1, -1\}$. The user equipment inserts three reference signal symbols $\{-1, -1, -1\}$ between the second and the third symbols of each group of sequence values (−1,−1,1,1), and an integrated modulated sequence obtained after a reference signal is inserted is {−1,−1,−1,−1,−1,1,1,−1,−1,−1,−1,1,1,1}. It may be understood that, in the specific example in this embodiment of the present invention, the modulated sequence obtained after the first sequence is modulated is the first sequence itself. However, in most cases, the modulated sequence obtained after modulation is a complex number sequence. A sequence value in the modulated sequence may be different from a sequence value in the first sequence, but the modulated sequence is still a transformation of the first sequence, and herein the modulated sequence is also referred to as the first sequence.

X02: Perform spectrum spreading on the first sequence by using a timeslot-level sequence to obtain a second sequence. This step may be performed by the baseband processor Y01 in the user equipment. The first sequence may be the original first sequence without a reference signal, or may be the integrated modulated sequence (that is, the first sequence with a reference signal), or may be a modulated sequence obtained after each bit of information of the first sequence is modulated (the sequence is modulated but is not inserted with a reference signal.) In this embodiment, the first sequences in several different forms (the unmodulated first sequence, the modulated first sequence, or the modulated first sequence inserted with a reference signal) are collectively referred to as the first sequence.

The timeslot-level sequence corresponds to one timeslot or subframe. One timeslot or subframe may include multiple symbols. When a timeslot or subframe at which uplink information is sent changes, phase rotation at a same angle occurs on all symbols of the timeslot or subframe. It is equivalent to that all the symbol values of the timeslot or subframe are multiplied by a same complex number, and a modulus value of the complex number is 1. For example, in a common cyclic prefix of an LTE system, each timeslot includes seven symbols, and a timeslot-level sequence with a length of 14 may correspond to two timeslots, that is, corresponding to one subframe, and may be {1,1,1,1,1,1,1,−1,−1,−1,−1,−1,−1,−1}. It may be known that values of all symbols of the timeslot-level sequence in the first timeslot of one subframe are {1,1,1,1,1,1,1}, and phases of seven symbols in the second timeslot of the subframe all are rotated by 180 degrees, which is equivalent to that −1 is multiplied, and values of the symbols in the second timeslot become {−1,−1,−1,−1,−1,−1,−1}.

In a method for performing spectrum spreading on the first sequence (the original first sequence and the integrated modulated sequence that undergoes modulation and that is inserted with a reference signal) by using the timeslot-level sequence, multiplication or modulo 2 addition is performed on a sequence value of each symbol of the timeslot-level sequence and a sequence value of a corresponding symbol of the first sequence or the integrated modulated sequence to obtain the second sequence. For example, sequence values of all symbols of an integrated modulated sequence with a reference signal and with a length of 14 are {1,1,1,−1,−1,−1,−1,−1,1,1,1}, and sequence values of all symbols of a timeslot-level sequence are {−1,−1,1,1,1,1,1,−1,−1, 1, 1, 1, 1,1}. Direct multiplication is used for spectrum spreading to obtain the second sequence{1,1,−1,−1,−1,1,1,1,1,−1,−1,−,1, 1}.

X03: Send the second sequence. This step may be performed by a wireless transceiver Y02 in the user equipment.

The user equipment maps the second sequence onto an uplink time-frequency resource scheduled by the base station for the user equipment, to form an uplink signal, and then sends the uplink signal. The uplink signal is to be sent to the base station. For example, in a common cyclic prefix of an LTE system, one subframe of a subcarrier includes two timeslots, each timeslot includes seven OFDM symbols, and therefore a total of 14 symbols may be sent. The user equipment may generate the second sequence {1,1,−1,−1,−1,1,1,1,1,1,−1,−1,−1,1,1,} according to X02, and successively map each sequence value in the second sequence onto a corresponding OFDM symbol of one subcarrier of the subframe. Optionally, the user equipment maps the second sequence onto a single subcarrier for sending. A bandwidth of the single subcarrier is 15 kHz or 3.75 kHz.

Optionally, before step X03, the method may further include: X04: Receive downlink control information sent by a base station, where the downlink control information includes an indication of a rule for mapping the uplink information onto the first sequence, an indication of the timeslot-level sequence, and a time-frequency resource for sending the second sequence. This step may be performed by the wireless transceiver Y02 in the user equipment. After X04, the method may optionally include: X05: Receive downlink data sent by the base station.

For example, the user equipment receives the DCI (downlink control information) sent by the base station. The DCI includes scheduling information required by the user equipment for receiving the downlink data. Optionally, the DCI further includes an indication of a rule for mapping the ACK onto the first sequence when the user equipment generates the first sequence, an indication of the timeslot-level sequence when the user equipment performs a spectrum spreading operation, and time and frequency resources used for sending the second sequence. For example, the DCI may include an OVSF code. The user equipment generates, according to the OVSF code, the first sequence indicating the ACK and NACK. The DCI may further include an index number of the timeslot-level sequence, a generation parameter of the timeslot-level sequence, or the like, where the index number is used to indicate a timeslot-level sequence in a timeslot-level sequence set, and the generation parameter is used to generate the timeslot-level sequence. The DCI may further include a start time at which the second sequence is sent, a frequency of a subcarrier on which the second sequence is sent, a quantity of retransmission times of the second sequence, and the like.

FIG. 27 is a schematic diagram of user equipment Y00 according to an embodiment of the present invention. The user equipment Y00 includes a baseband processor Y01 and a wireless transceiver Y02. As described in the foregoing method embodiment, the baseband processor Y01 and the wireless transceiver Y02 are configured to perform a corresponding step in the method. The baseband processor Y01 and the wireless transceiver Y02 are coupled by using a bus or an interface Y03. The baseband processor Y01 is configured to perform signal processing related to communication, and the wireless transceiver Y02 is configured to receive and send a wireless signal. Specifically, the wireless transceiver Y02 may receive and send the wireless signal by using an antenna Y04.

Figure 28:
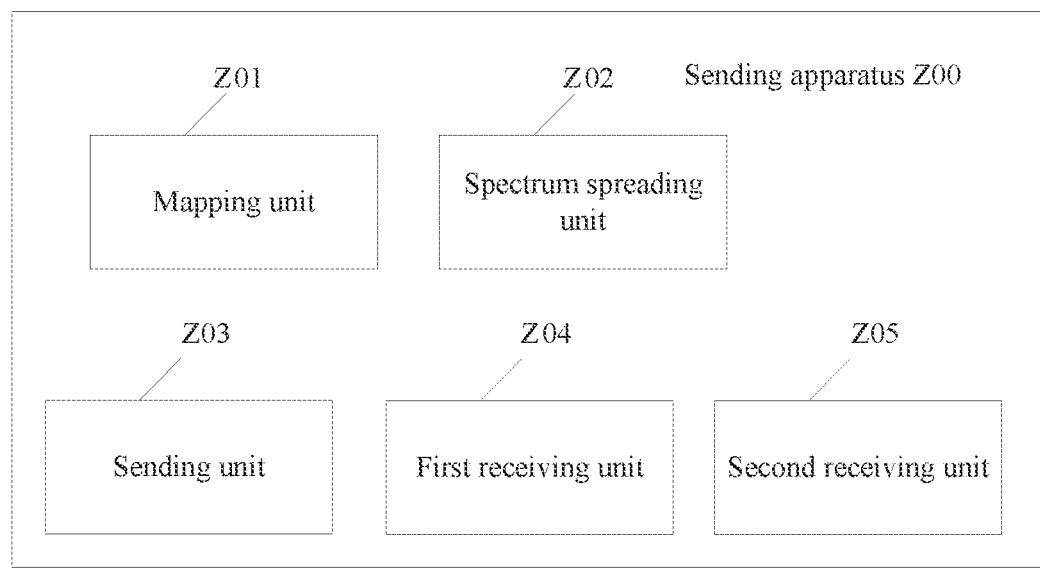
FIG. 28 is a schematic diagram of another uplink information sending apparatus according to an embodiment of the present invention.

Referring to FIG. 26 and FIG. 27, FIG. 28 is an uplink information sending apparatus Z00 according to an embodiment of the present invention. The uplink information sending apparatus Z00 includes: a mapping unit Z01, configured to map uplink information onto a first sequence; a spectrum spreading unit Z02, configured to perform spectrum spreading on a first sequence by using a timeslot-level sequence to obtain a second sequence; and a sending unit Z03, configured to send the second sequence. Optionally, the sending apparatus Z00 may further include a first receiving unit Z04, configured to receive downlink control information sent by a base station. The downlink control information includes an indication of the timeslot-level sequence. Optionally, the sending apparatus Z00 may further include a second receive unit Z04, configured to receive downlink data sent by the base station. For a specific function of each unit in the apparatus corresponding to FIG. 28, refer to descriptions in the foregoing method embodiments.

In the embodiments corresponding to FIG. 26 to FIG. 28 in the present invention, uplink information is processed by using a preset mapping rule to obtain a first sequence, and a timeslot-level sequence is used for further processing, so that multiple pieces of uplink information of user equipment are sent, without mutual interference, to a base station at a same time resource and frequency resource, saving uplink communication resources and increasing an uplink capacity of a system. Especially, resources for sending an ACK or NACK are saved, improving HARQ feedback efficiency of the user equipment. Therefore, it may be considered that this embodiment equivalently resolves the following technical problem: how to save resources for sending uplink information. Especially, resources for uplink HARQ feedback are saved, and HARQ feedback efficiency of the user equipment is improved.

Figure 29:
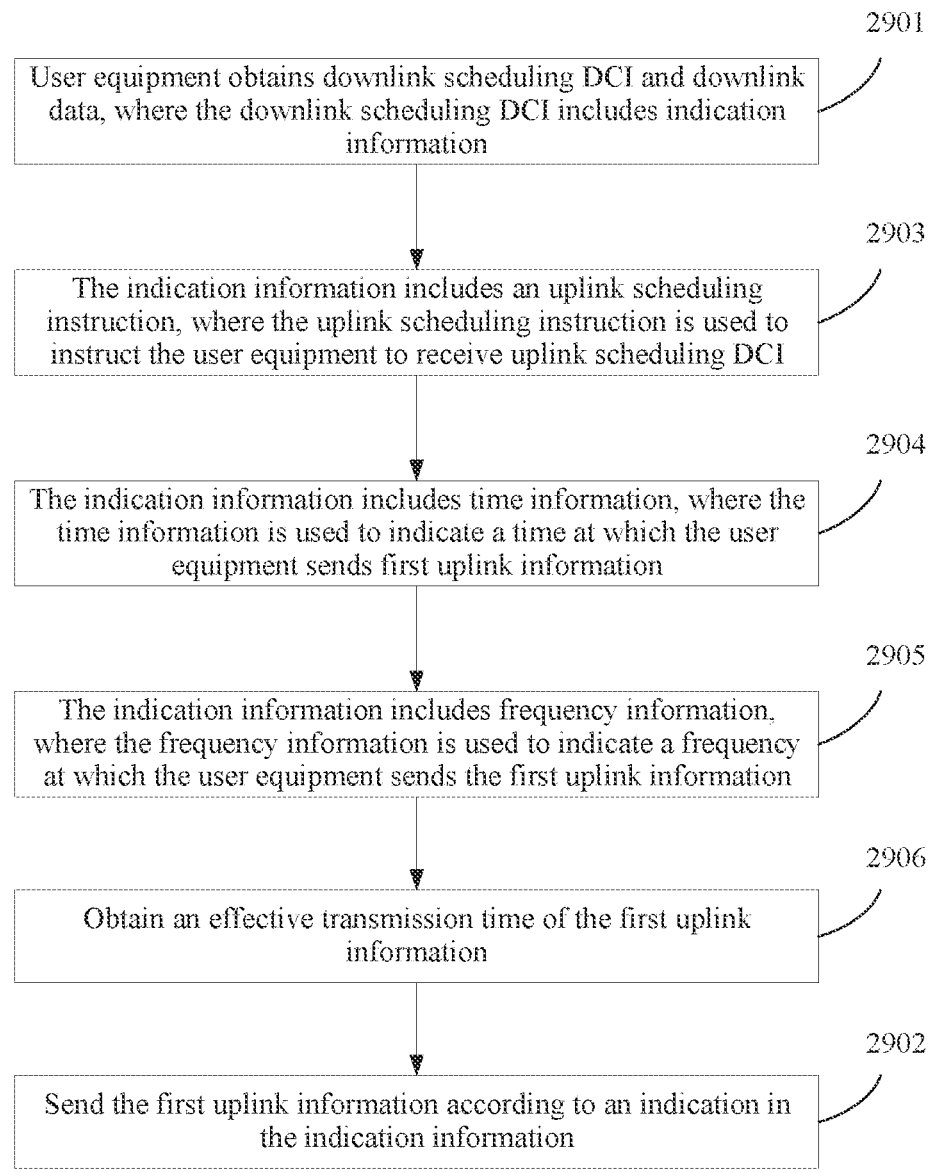
FIG. 29 is a schematic diagram of another uplink information sending method according to an embodiment of the present invention.

Referring to FIG. 29, an uplink information sending method according to another embodiment of the present invention includes the following steps.

2901: User equipment obtains downlink scheduling DCI and downlink data.

The downlink scheduling DCI includes indication information and scheduling information required by the user equipment for receiving the downlink data. For example, when the downlink data is sent on a physical downlink shared channel PDSCH, the downlink scheduling DCI indicates a specific time at which the PDSCH is sent, a channel frequency at which the PDSCH is sent, a modulation and coding scheme used when the PDSCH is sent, and the like. The indication information is used to instruct the user equipment to send first uplink information. The first uplink information is used to indicate whether the user equipment receives the downlink data correctly. For example, the first uplink information may be an ACK or NACK message in a hybrid automatic repeat request.

2902: The user equipment sends first uplink information according to an indication in indication information.

Optionally, the method may further include: 2903: The indication information includes an uplink scheduling instruction, where the uplink scheduling instruction is used to instruct the user equipment to receive uplink scheduling DCI, and the uplink scheduling DCI includes scheduling information required for sending the first uplink information.

After receiving the indication information, the user equipment receives the uplink scheduling DCI according to the indication in the indication information to obtain scheduling information in the uplink scheduling DCI, for example, a specific time when the first uplink information is transmitted, a channel frequency at which the first uplink information is transmitted, a modulation and coding scheme used when the first uplink information is transmitted, and a size of a transport block used when the first uplink information is transmitted.

Optionally, the method may further include: 2904: The indication information includes time information, where the time information is used to indicate a time at which the user equipment sends the first uplink information.

The time information indicates that the user equipment sends the first uplink information at a preset time point, or the time information indicates an interval from a preset time point to the time at which the first uplink information is sent. For example, the preset time point is the $k^{th}$ subframe that is after the user equipment receives the downlink scheduling DCI, where k is an integer greater than 0. The user equipment may start to send, according to the indication in the time information, uplink information at the $k^{th}$ subframe that is after the downlink scheduling DCI is received. If the time information includes the time interval, for example, the time information is an integer m that is greater than 0, the user equipment starts to send the first uplink information at the $(k+m)^{th}$ subframe that is after the downlink scheduling DCI is received. The preset time point may be further defined as the $k^{th}$ subframe that is after the user equipment receives the downlink data, or defined similarly, which is not limited in this embodiment of the present invention.

The preset time point is a parameter obtained by the user equipment from the downlink scheduling DCI or the downlink data, or a parameter preset in the user equipment. For example, the user equipment may obtain, from the downlink data, a system information parameter configured by a network, or obtain, from the downlink data, a dedicated radio resource control RRC parameter configured by a network for the user equipment, to obtain the preset time point from the parameter, or the preset time point may be directly preset in the user equipment, which is not limited in this embodiment of the present invention.

Optionally, the method may further include: 2905: The indication information includes frequency information, where the frequency information is used to indicate a frequency at which the user equipment sends the first uplink information. The frequency information may directly indicate that the user equipment sends the first uplink information on a preset carrier, or the frequency information may indicate an interval between a carrier at which the first uplink information is sent and a preset carrier.

The preset frequency is a parameter obtained by the user equipment from the downlink scheduling DCI or the downlink data, or a parameter preset in the user equipment. For example, the user equipment may obtain, from the downlink data, a system information parameter configured by a network, or obtain, from the downlink data, a dedicated radio resource control RRC parameter configured by a network for the user equipment, to obtain the preset frequency from the parameter, or the preset frequency may be directly preset in the user equipment, which is not limited in this embodiment of the present invention.

In an example of this embodiment, the indication information is an indication field of three bits. Meanings of indications are listed in Table 1.

TABLE 1

| Indication field of three bits | Sending time indication | Sending frequency (subcarrier offset relative to a preset frequency) Unit: subcarrier |
|---|---|---|
| 000 | The first uplink information is sent at a first preset time point (12 milliseconds) after a PDSCH is received. | 1 |
| 001 | | 2 |
| 010 | | 3 |
| 011 | | 4 |
| 100 | The first uplink information is sent at a second preset time point (24 milliseconds) after a PDSCH is received. | 1 |
| 101 | | 2 |
| 110 | | 3 |
| 111 | The uplink scheduling DCI is listened to separately | |

TABLE 1-continued

| Indication field of three bits | Sending time indication | Sending frequency (subcarrier offset relative to a preset frequency) Unit: subcarrier |
|---|---|---|
| | to obtain scheduling information for sending the first uplink information. | |

In the example described in Table 1, when a value of the indication information is 010, it indicates that a time at which the user equipment sends the first uplink information is 12 milliseconds after the PDSCH is received, and a sending frequency is a carrier that has an interval of one subcarrier with the preset frequency. When a value of the indication information is 111, it indicates that the user equipment receives the uplink scheduling DCI, where the uplink scheduling DCI includes the scheduling information of the first uplink information.

Optionally, the method may further include: 2906: The user equipment sends the first uplink information according to an effective transmission time of the first uplink information. The effective transmission time includes a quantity of retransmission times of a resource element of the first uplink information or time duration for transmitting the first uplink information. For example, in an LTE system, a resource element of uplink information is one millisecond in terms of time. If the effective transmission time includes retransmission times N, the user equipment sends each millisecond of resource element of the first uplink information N times.

The user equipment may obtain the effective transmission time of the first uplink information in multiple manners. In an example, the effective transmission time is a parameter obtained by the user equipment from control signaling, where the control signaling is at least one of physical layer signaling, radio resource control RRC signaling, or system information.

Alternatively, the effective transmission time is obtained by the user equipment from a mapping of a control parameter of second uplink information, where the control parameter of the second uplink information includes at least one of a modulation and coding scheme MCS of the second uplink information, a quantity of retransmission times of a resource element of the second uplink information, or a quantity of subcarriers of the second uplink information, and the second uplink information is sent before the first uplink information. For example, when the user equipment is connected to a network by means of random access, the base station schedules, by using a random access response RAR message, the user equipment to send a fourth message Msg4. The RAR message includes a parameter necessary for sending Msg3, such as a time at which the Msg3 is transmitted, a frequency at which the Msg3 is transmitted, an MCS used when the Msg3 is transmitted, a quantity of retransmission times of a resource element for transmitting the Msg3, and a size of a transport block used when the Msg3 is transmitted. After sending the Msg3, the user equipment receives the fourth message Msg4 sent by the base station, and feeds back an ACK or NACK to notify the base station of whether the Msg4 is correctly received. According to the method in this embodiment, a mapping rule may be constructed between a control parameter and an effective transmission time of a resource element of the ACK/NACK according to one control parameter in the Msg3 or a combination of multiple control parameters in the Msg3. For example, one mapping rule is: Quantity of retransmission times of a resource element of ACK/NACK=Quantity of retransmission times of Msg3×2

In the mapping rule, the user equipment needs to receive only a quantity of retransmission times that is of a resource element of ACK/NACK of Msg4 and that may be obtained by obtaining a control parameter in the RAR, and no signaling needs to be used additionally for control.

Alternatively, the effective transmission time is obtained by the user equipment from a resource mapping of a physical random access channel PRACH. The user equipment needs to use a PRACH resource to randomly connect to a base station in a network, and the base station may group PRACH resources into PRACH resource pools according to a coverage status, a geographical position, and the like that are of the user equipment. Therefore, a PRACH resource selected by the user equipment from a specific PRACH resource pool may also reflect a current coverage status of the user equipment, a rule may be set for mapping a PRACH resource onto the effective transmission time of the first uplink information, and duration information of the first uplink information may be directly obtained according to the PRACH resource mapping.

For example, the base station divides PRACH resources as follows:

resource pool 1: user equipment with good coverage or close to the base station;

resource pool 2: user equipment with poor coverage or far from the base station; and resource pool 3: user equipment with extremely poor coverage or at a cell edge.

The mapping rule is:

Quantity of retransmission times of a resource element of the first uplink information=Sequence number of a resource pool in which a PRACH resource is located×4

The user equipment may obtain a quantity of retransmission times of the uplink information according to a PRACH resource used when the user equipment performs random access.

Alternatively, the effective transmission time is a parameter preset in the user equipment.

Figure 30:
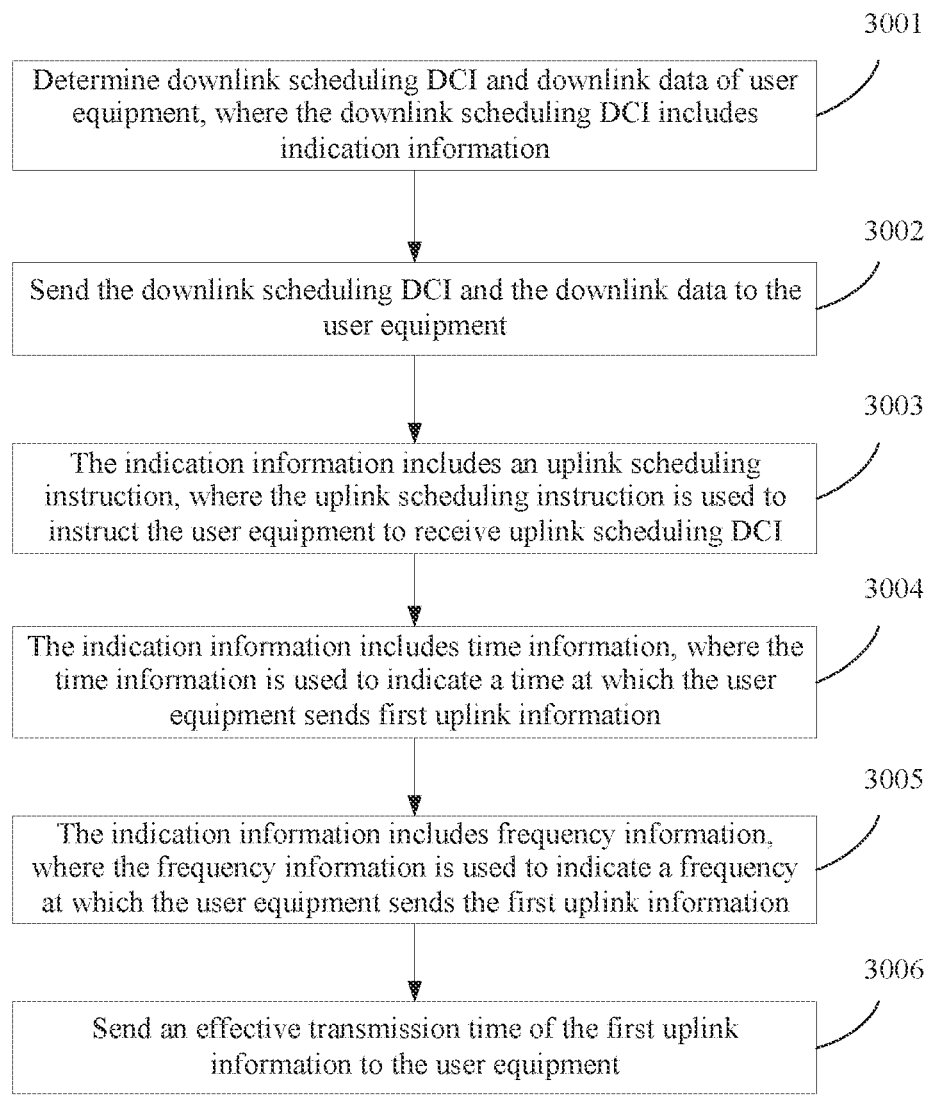
FIG. 30 is a schematic diagram of another system scheduling method according to an embodiment of the present invention.

In the embodiment corresponding to FIG. 29 in the present invention, indication information in the downlink scheduling DCI is used to instruct user equipment to send first uplink information, so that a base station in a narrowband communications system can flexibly schedule multiple user equipments to send without mutual interference an ACK or NACK on a frequency resource, and system bandwidth use efficiency is also improved. Referring to FIG. 30, a system scheduling method according to another embodiment of the present invention includes the following steps:

3001: Determine downlink scheduling DCI and downlink data of user equipment, where the downlink scheduling DCI includes indication information and scheduling information required by the user equipment for receiving the downlink data. The indication information is used to instruct the user equipment to send first uplink information. The first uplink information is used to indicate whether the user equipment receives the downlink data correctly.

3002: Send the downlink scheduling DCI and the downlink data to the user equipment.

Optionally, the method may further include: 3003: The indication information includes an uplink scheduling instruction, where the uplink scheduling instruction is used to instruct the user equipment to receive uplink scheduling DCI, and the uplink scheduling DCI includes scheduling information required for sending the first uplink information.

Optionally, the method may further include: 3004: The indication information includes time information, where the time information is used to indicate a time at which the user equipment sends the first uplink information;

the time information indicates that the user equipment sends the first uplink information at a preset time point; or the time information indicates an interval from a preset time point to the time at which the first uplink information is sent; and the preset time point is a parameter obtained by the user equipment from the downlink scheduling DCI or the downlink data, or a parameter preset in the user equipment.

Optionally, the method may further include: 3005: The indication information includes frequency information, where the frequency information is used to indicate a frequency at which the user equipment sends the first uplink information.

The frequency information indicates that the user equipment sends the first uplink information at a preset frequency; or the frequency information indicates an interval from a preset frequency to the frequency at which the first uplink information is sent; and the preset frequency is a parameter obtained by the user equipment from the downlink scheduling DCI or the downlink data, or a parameter preset in the user equipment.

Optionally, the method may further include: 3006: Send an effective transmission time of the first uplink information to the user equipment, where the effective transmission time includes a quantity of retransmission times of a resource element of the first uplink information or time duration for transmitting the first uplink information.

The effective transmission time is a parameter included in control signaling, where the control signaling is at least one of physical layer signaling, radio resource control RRC signaling, or system information.

For the embodiment or optional embodiments corresponding to FIG. 30 in the present invention, reference may be made to descriptions about FIG. 29 for understanding, and details are not described herein.

FIG. 27 is a schematic diagram of user equipment Y00 according to an embodiment of the present invention. The user equipment Y00 includes a baseband processor Y01 and a wireless transceiver Y02. As described in the foregoing method embodiment, the baseband processor Y01 and the wireless transceiver Y02 are configured to perform a corresponding step in the method. The baseband processor Y01 and the wireless transceiver Y02 are coupled by using a bus or an interface Y03. The baseband processor Y01 is configured to perform signal processing related to communication, and the wireless transceiver Y02 is configured to receive and send a wireless signal. Specifically, the wireless transceiver Y02 may receive and send the wireless signal by using an antenna Y04.

Figure 31:
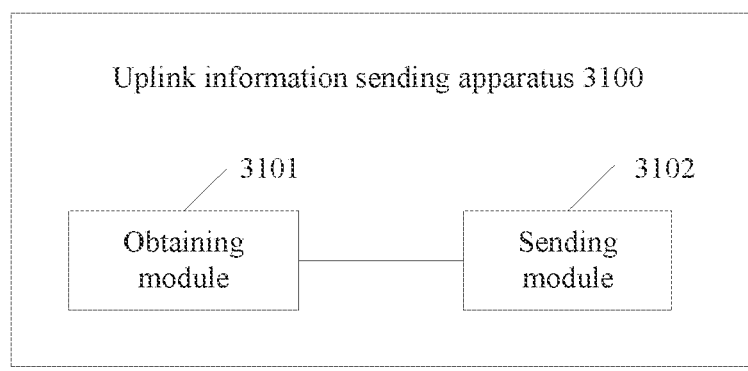
FIG. 31 is a schematic diagram of another uplink information sending apparatus according to an embodiment of the present invention.

Referring to FIG. 29 and FIG. 27, FIG. 31 shows an uplink information sending apparatus 3100 according to an embodiment of the present invention. The uplink information sending apparatus 3100 includes: an obtaining module 3101, configured to obtain downlink scheduling DCI and downlink data, and located in a baseband processor Y01; and a sending module 3102, configured to send first uplink information according to an indication in the indication information, and located in a wireless transceiver Y02. For a specific function of each module in the apparatus corresponding to FIG. 31, refer to descriptions in the foregoing method embodiments.

Figure 32:
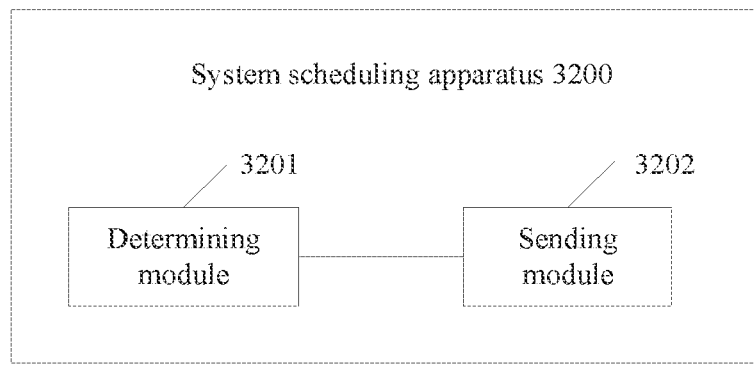
FIG. 32 is a schematic diagram of another system scheduling apparatus according to an embodiment of the present invention.

Referring to FIG. 30, FIG. 32 shows a system scheduling apparatus EE00 according to an embodiment of the present invention. The system scheduling apparatus EE00 includes: a determining module 3201, configured to determine downlink scheduling DCI and downlink data of user equipment; and a sending module 3202, configured to send the downlink scheduling DCI and the downlink data to the user equipment.

In the embodiments corresponding to FIG. 29 to FIG. 32 in the present invention, indication information in downlink scheduling DCI is used to instruct user equipment to send first uplink information, so that a base station in a narrowband communications system can flexibly schedule multiple user equipments to send without mutual interference an ACK or NACK on a frequency resource, and system bandwidth use efficiency is also improved.

Figure 33:
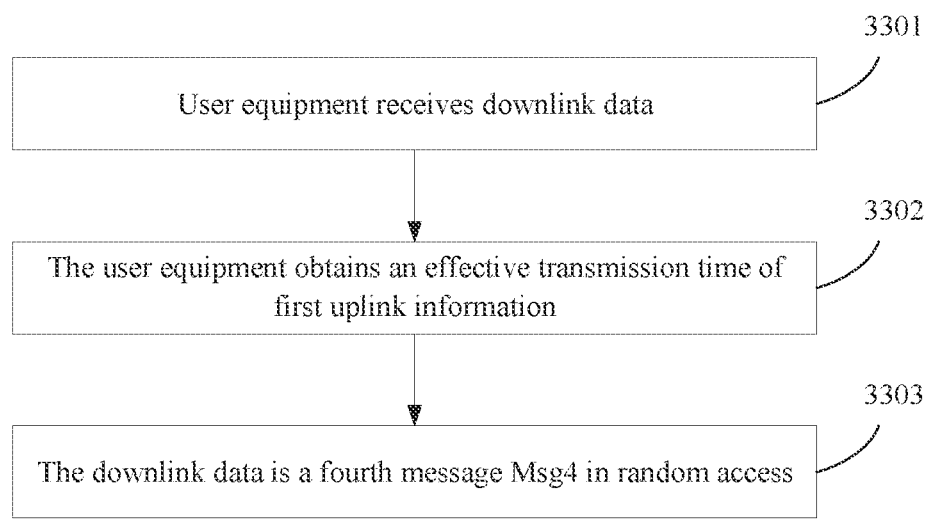
FIG. 33 is a schematic diagram of another uplink information sending method according to an embodiment of the present invention.

Referring to FIG. 33, an uplink information sending method according to another embodiment of the present invention includes the following steps:

3301: User equipment receives downlink data.

3302: The user equipment obtains an effective transmission time of first uplink information, and sends the uplink information according to the effective transmission time, where the first uplink information is used to indicate whether the user equipment receives the downlink data correctly;

the effective transmission time includes a quantity of retransmission times of a resource element of the first uplink information or time duration for transmitting the first uplink information; and the effective transmission time is obtained by the user equipment from a mapping of a control parameter of second uplink information, where the control parameter of the second uplink information includes at least one of a modulation and coding scheme MCS of the second uplink information, a quantity of retransmission times of a resource element of the second uplink information, or a quantity of subcarriers of the second uplink information, and the second uplink information is sent before the first uplink information; or the effective transmission time is obtained by the user equipment from a resource mapping of a physical random access channel PRACH.

Optionally, the method may further include: 3303: The downlink data is a fourth message Msg4 in random access, and the second uplink information is a third message Msg3 in the random access. For the embodiment or optional embodiment corresponding to FIG. 33 in the present invention, reference may be made to descriptions about FIG. 29 for understanding, and details are not described herein.

Figure 34:
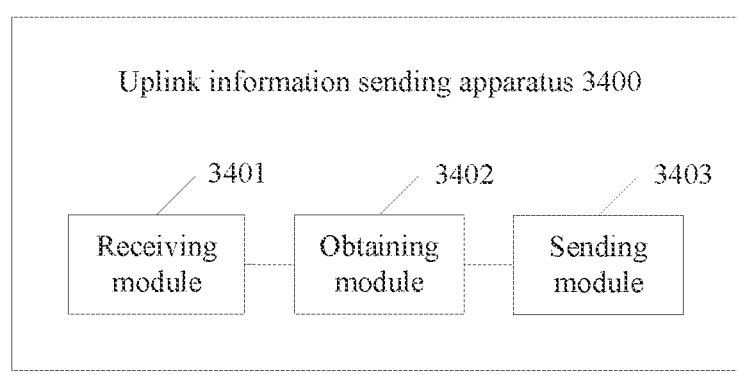
FIG. 34 is a schematic diagram of another uplink information sending apparatus according to an embodiment of the present invention.

Referring to FIG. 27 and FIG. 33, FIG. 34 shows an uplink information sending apparatus 3400 according to an embodiment of the present invention. The uplink information sending apparatus 3400 includes: a receiving module 3401, configured to receive downlink data, and located in a wireless transceiver Y02; an obtaining module 3402, configured to obtain an effective transmission time of first uplink information, and located in a baseband processor Y01; and a sending module 3403, configured to send the uplink information according to the effective transmission time, and located in the wireless transceiver Y02. For a specific function of each module in the apparatus corresponding to FIG. 34, refer to descriptions in the foregoing method embodiments.

In the embodiments corresponding to FIG. 33 and FIG. 34 in the present invention, user equipment may obtain, from a mapping of a control parameter of second uplink information or a mapping of a randomly accessed PRACH resource, an effective transmission time for sending first uplink information, and a base station does no need to use additional signaling to perform configuration. This simplifies a signaling process between the base station and the user equipment and implementation of the user equipment.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method performed by a terminal device, comprising:
   obtaining downlink control information, wherein the downlink control information schedules transmission of downlink data, and the downlink control information carries time information indicating a time at which uplink information is sent;
   receiving the downlink data; and
   sending the uplink information according to the time information and an uplink modulation and coding scheme (MCS), the uplink MCS being preset in the terminal device, wherein the uplink information indicates whether the downlink data is correctly received.

2. The method according to claim 1, further comprising: obtaining, through radio resource control signaling or a resource of a physical random access channel, information indicating a duration for sending the uplink information, wherein the information indicating the duration for sending the uplink information comprises a quantity of repetition times for sending the uplink information, and wherein the sending the uplink information according to the time information and the uplink MCS comprises: sending the uplink information according to the time information, the information indicating the duration, and the uplink MCS.

3. The method according to claim 1, wherein the time information indicates an interval from a time point to the time at which the uplink information is sent, wherein the time point is obtained based on the downlink control information.

4. The method according to claim 3, wherein the time point is a time at which reception of the downlink data is completed.

5. The method according to claim 1, wherein the downlink control information further comprises frequency information, wherein the frequency information indicates a frequency at which the uplink information is sent.

6. A method performed by a network device, the method comprising:
   indicating, to a terminal device through radio resource control signaling or a resource of a physical random access channel, information of a duration for sending uplink information by the terminal device;
   sending downlink control information to the terminal device, wherein the downlink control information schedules transmission of downlink data to the terminal device and carries time information indicating a time at which the uplink information is sent, wherein the uplink information indicates whether the downlink data is correctly received;
   sending the downlink data to the terminal device; and
   receiving the uplink information from the terminal device.

7. The method according to claim 6, wherein the information of the duration for sending the uplink information comprises a quantity of repetition times for sending the uplink information.

8. The method according to claim 6, wherein the time information indicates an interval from a time point to the time at which the uplink information is sent, wherein the time point is obtained based on the downlink control information.

9. The method according to claim 8, wherein the time point is a time at which reception of the downlink data is completed.

10. The method according to claim 6, wherein the downlink control information further comprises frequency information, wherein the frequency information indicates a frequency at which the uplink information is sent.

11. An apparatus, comprising:
    a processor; and
    a non-transitory computer readable storage medium storing a program, wherein when executed by the processor, the program causes the apparatus to:
    obtain downlink control information, wherein the downlink control information schedules transmission of downlink data, and the downlink control information carries time information indicating a time at which uplink information is sent;
    receive the downlink data; and
    send the uplink information according to the time information and an uplink modulation and coding scheme (MCS), the uplink MCS being preset in the apparatus, wherein the uplink information indicates whether the downlink data is correctly received.

12. The apparatus according to claim 11, wherein when executed by the processor, the program further causes the apparatus to: obtain, through radio resource control signaling or a resource of a physical random access channel, information indicating a duration for sending the uplink information, wherein the information indicating the duration for sending the uplink information comprises a quantity of repetition times for sending the uplink information, and wherein the sending the uplink information according to the time information and the uplink MCS comprises: sending the uplink information according to the time information, the information indicating the duration, and the uplink MCS.

13. The apparatus according to claim 11, wherein the time information indicates an interval from a time point to the time at which the uplink information is sent, wherein the time point is obtained based on the downlink control information.

14. The apparatus according to claim 13, wherein the time point is a time at which reception of the downlink data is completed.

15. The apparatus according to claim 11, wherein the downlink control information further comprises frequency information, wherein the frequency information indicates a frequency at which the uplink information is sent.

16. An apparatus, comprising:
    a processor; and
    a non-transitory computer readable storage medium storing a program, wherein when executed by the processor, the program causes the apparatus to:

indicate, to a terminal device through radio resource control signaling or a resource of a physical random access channel, information of a duration for sending uplink information by the terminal device;

send downlink control information to the terminal device, wherein the downlink control information schedules transmission of downlink data to the terminal device and carries time information indicating a time at which the uplink information is sent, wherein the uplink information indicates whether the downlink data is correctly received;

send the downlink data to the terminal device; and receive the uplink information from the terminal device.

17. The apparatus according to claim 16, wherein the information of the duration for sending the uplink information comprises a quantity of repetition times for sending the uplink information.

18. The apparatus according to claim 16, wherein the time information indicates an interval from a time point to the time at which the uplink information is sent, wherein the time point is obtained based on the downlink control information.

19. A system, comprising:
a terminal device configured to:
  obtain downlink control information, wherein the downlink control information schedules transmission of downlink data, and the downlink control information carries time information indicating a time at which uplink information is sent;
  receive the downlink data; and
  send the uplink information according to the time information and an uplink modulation and coding scheme (MCS), the uplink MCS being preset in the terminal device; and
a network device configured to:
  send the downlink control information to the terminal device;
  send the downlink data to the terminal device; and
  receive the uplink information from the terminal device.

20. The system according to the claim 19, wherein the terminal device is further configured to: obtain, through radio resource control signaling or a resource of a physical random access channel, information indicating a duration for sending the uplink information;
wherein the sending the uplink information according to the time information and the MCS comprises: sending the uplink information according to the time information, the information indicating the duration, and the uplink MCS; and
wherein the network device is further configured to: indicate, to the terminal device through the radio resource control signaling or the resource of the physical random access channel, the information indicating the duration.

* * * * *

UNITED STATES PATENT AND TRADEMARK OFFICE
CERTIFICATE OF CORRECTION

PATENT NO. : 11,388,710 B2
APPLICATION NO. : 17/091183
DATED : July 12, 2022
INVENTOR(S) : Han Zhou It is certified that error appears in the above-identified patent and that said Letters Patent is hereby corrected as shown below:

In the Specification

In the Detailed Description of Illustrative Embodiments; Column 29, Line 57; delete "1" and insert --11--.

In the Detailed Description of Illustrative Embodiments; Column 30, Line 14; delete "1" and insert --11--.

In the Detailed Description of Illustrative Embodiments; Column 30, Line 15; delete "1" and insert --11--.

In the Detailed Description of Illustrative Embodiments; Column 32, Line 12; delete "1" and insert --11--.

In the Detailed Description of Illustrative Embodiments; Column 57, Line 57; delete "{1, 1, 1, -1, -1, -1, -1, -1, 1, 1}" and insert --{-1,-1,-1,-1,-1, 1, 1, -1, -1, -1, -1, -1, 1,1}--.

In the Detailed Description of Illustrative Embodiments; Column 58, Line 7; delete "{1,1, -1, -1, -1,1, 1, 1, 1, -1, -1, -1, 1}" and insert --{1,1, -1, -1, -1,1, 1, 1, 1, -1, -1, -1, 1, 1}--.

Signed and Sealed this
Thirteenth Day of September, 2022

Katherine Kelly Vidal
*Director of the United States Patent and Trademark Office*